June 5, 1951 R. D. DODGE 2,555,734
AUTOMATIC JUSTIFYING TYPEWRITER
Filed Dec. 21, 1945 15 Sheets-Sheet 1
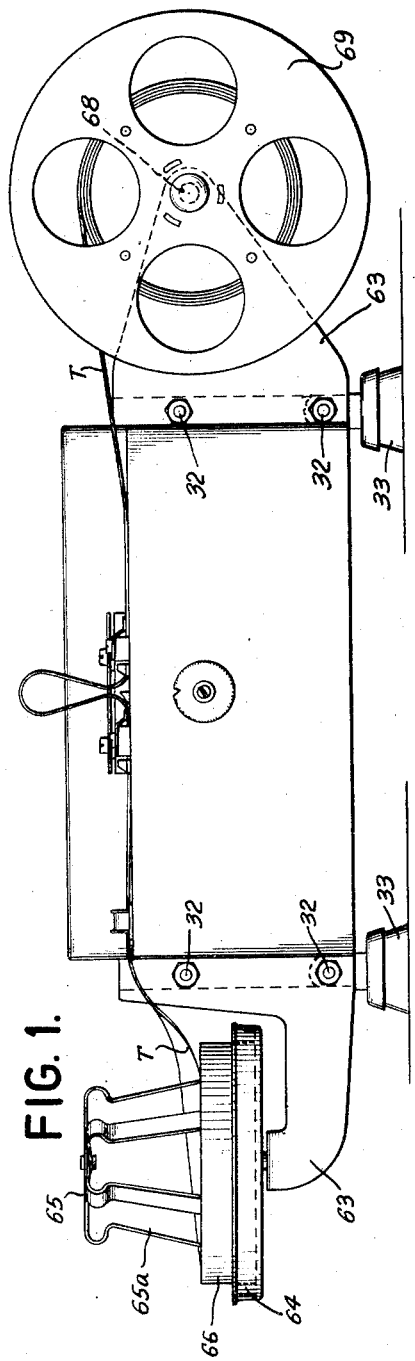
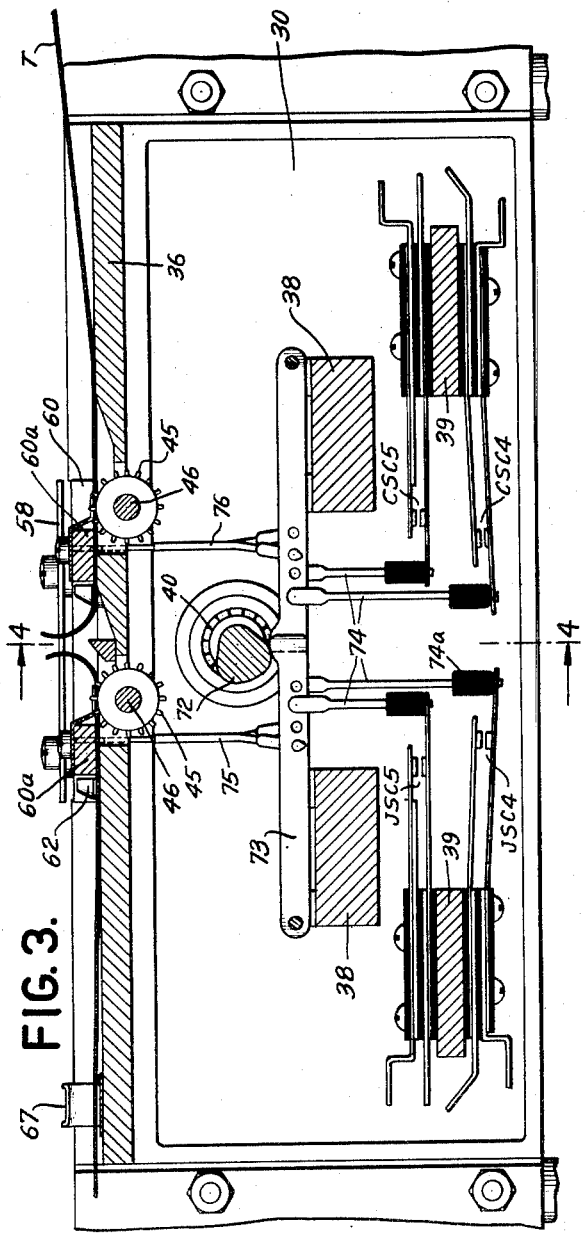
INVENTOR
R. D. Dodge
BY
ATTORNEY

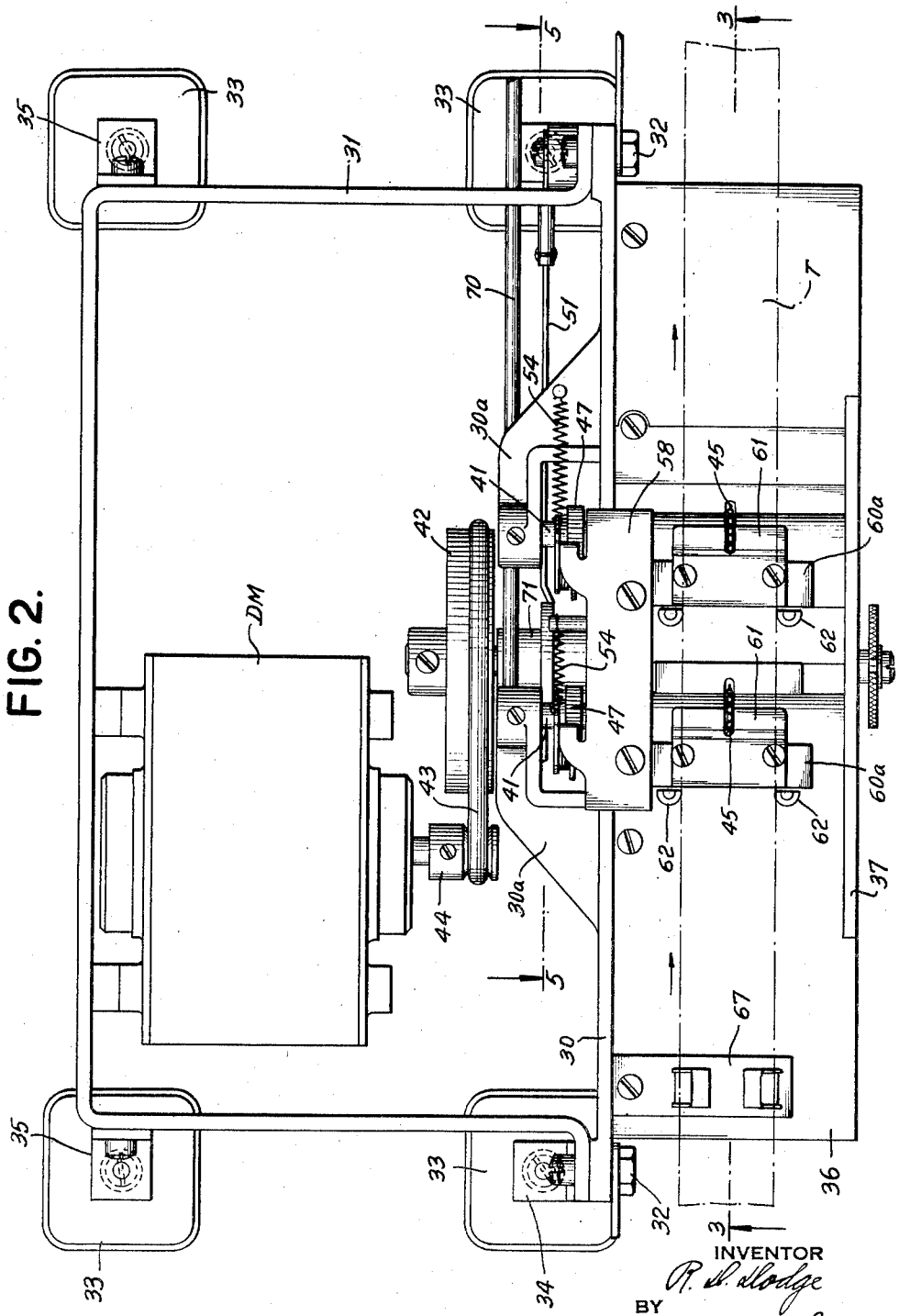

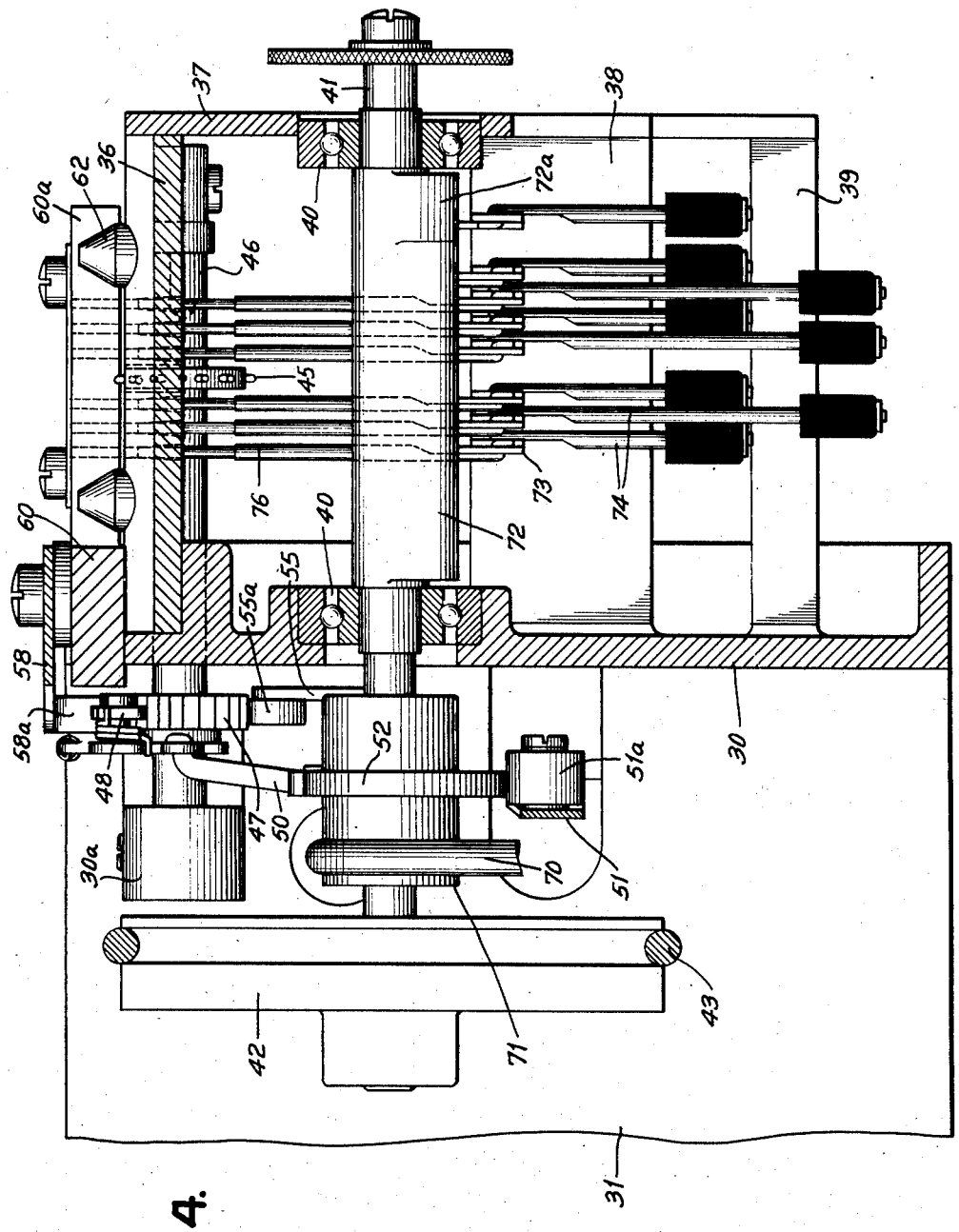

June 5, 1951  R. D. DODGE  2,555,734
AUTOMATIC JUSTIFYING TYPEWRITER
Filed Dec. 21, 1945  15 Sheets-Sheet 4

INVENTOR
R. D. Dodge
BY
ATTORNEY

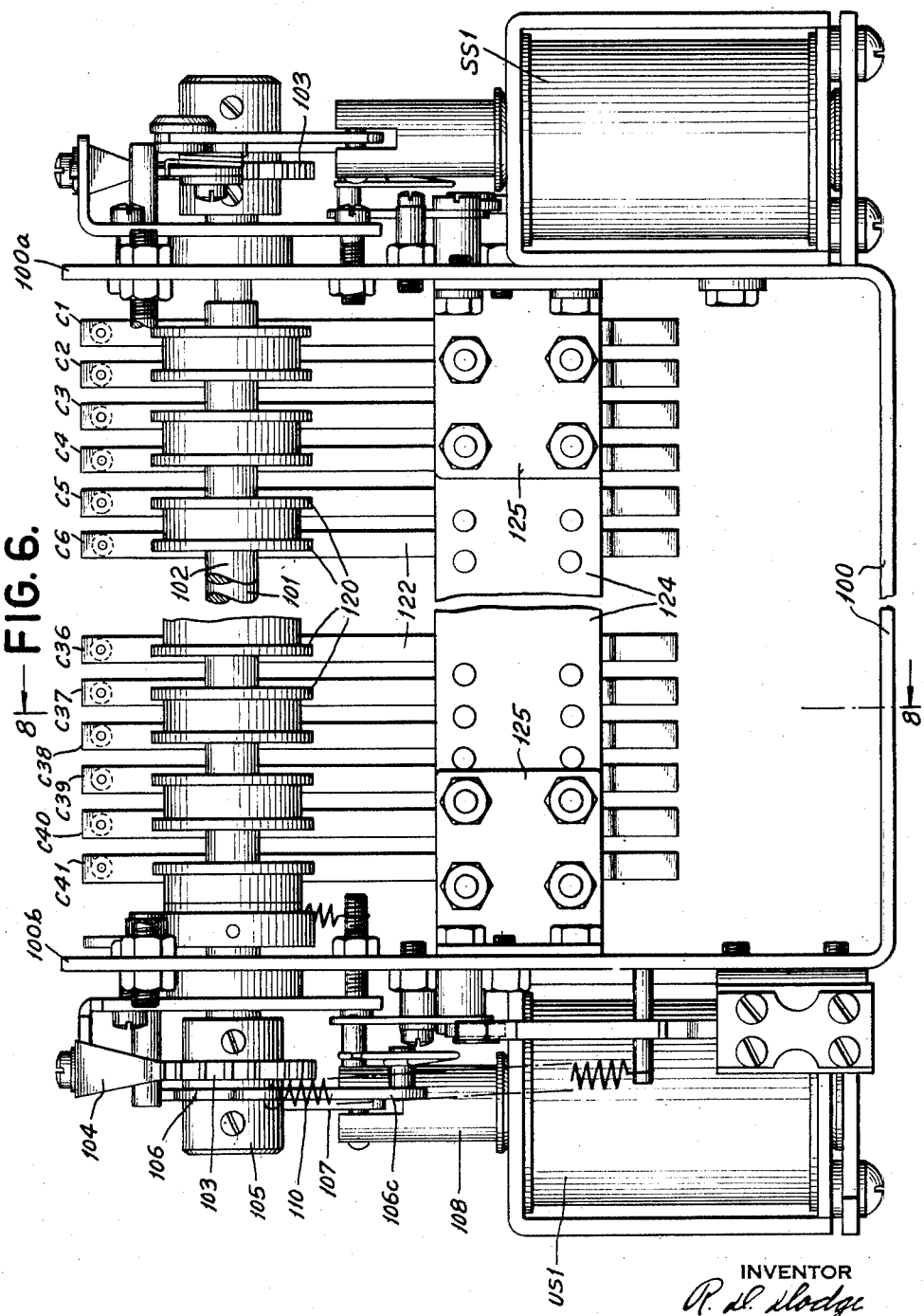

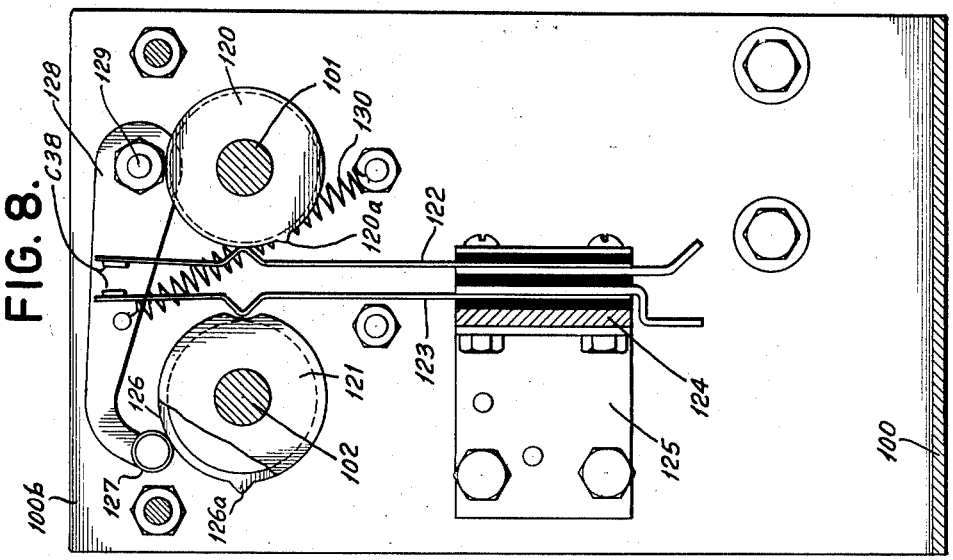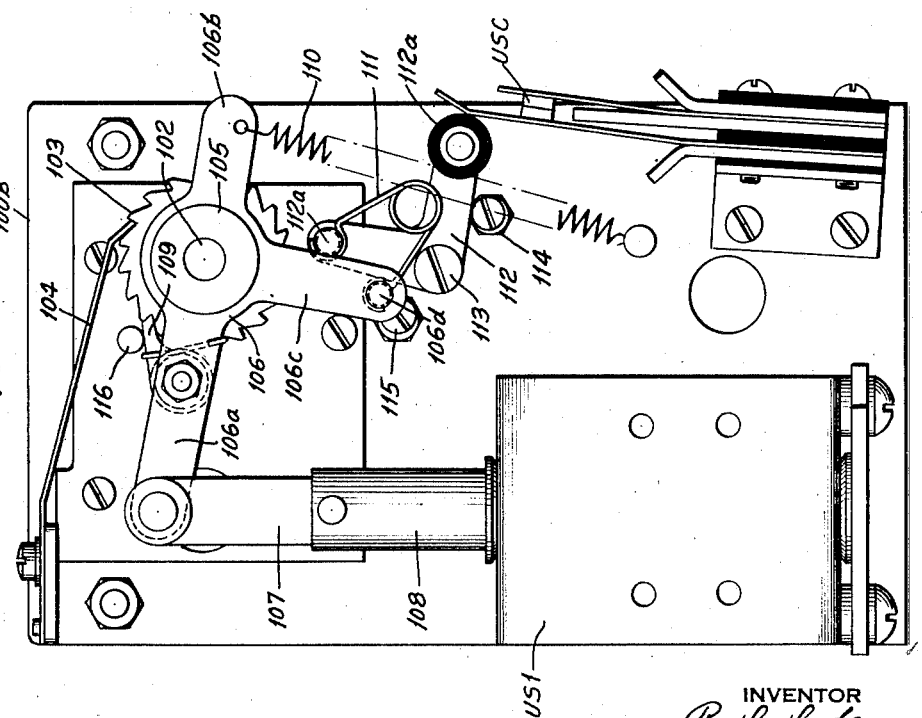

June 5, 1951  R. D. DODGE  2,555,734
AUTOMATIC JUSTIFYING TYPEWRITER
Filed Dec. 21, 1945  15 Sheets-Sheet 7

INVENTOR
R. D. Dodge
BY
ATTORNEY

June 5, 1951 R. D. DODGE 2,555,734
AUTOMATIC JUSTIFYING TYPEWRITER
Filed Dec. 21, 1945 15 Sheets-Sheet 8

INVENTOR
R. D. Dodge
BY
ATTORNEY

June 5, 1951 R. D. DODGE 2,555,734
AUTOMATIC JUSTIFYING TYPEWRITER
Filed Dec. 21, 1945 15 Sheets-Sheet 9

INVENTOR
R. D. Dodge
BY
ATTORNEY

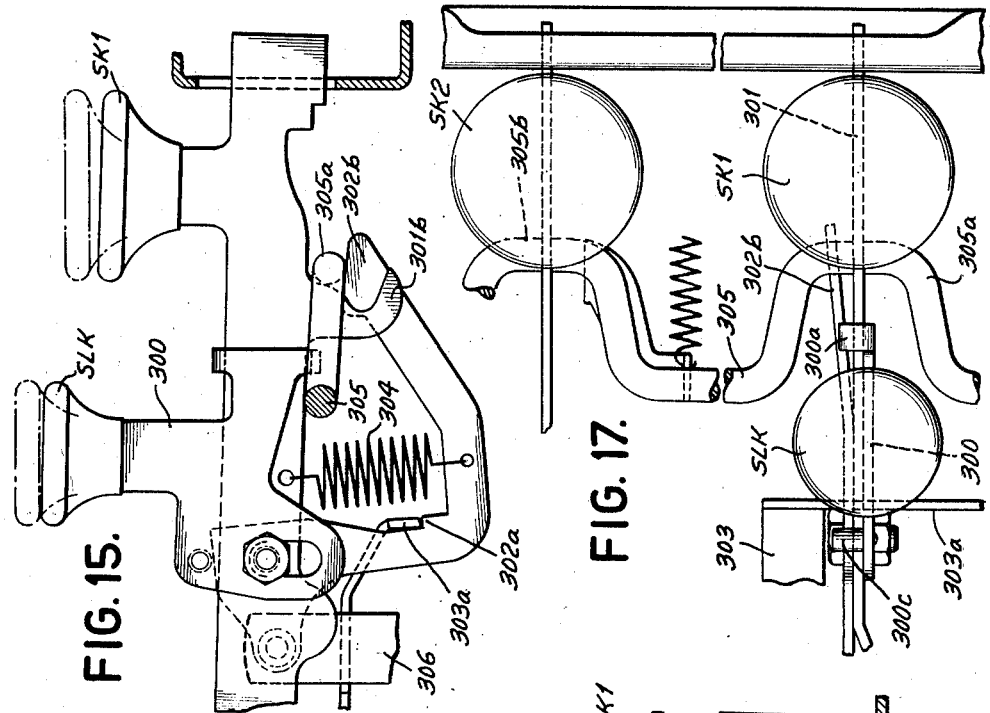
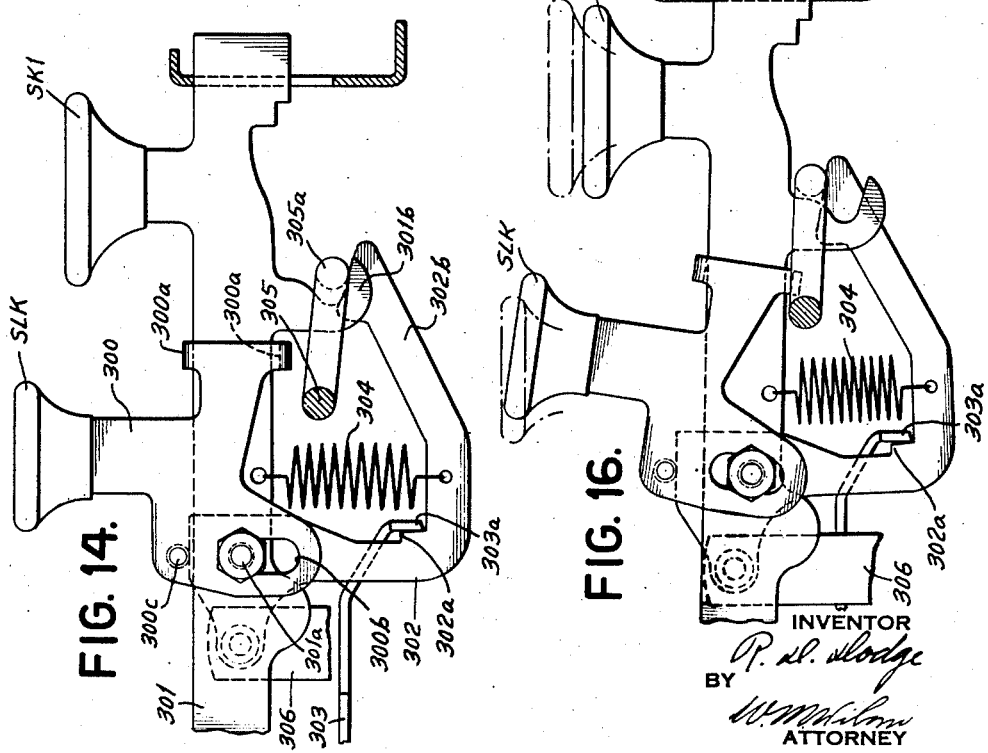

June 5, 1951     R. D. DODGE     2,555,734
AUTOMATIC JUSTIFYING TYPEWRITER
Filed Dec. 21, 1945     15 Sheets-Sheet 11

FIG. 18.

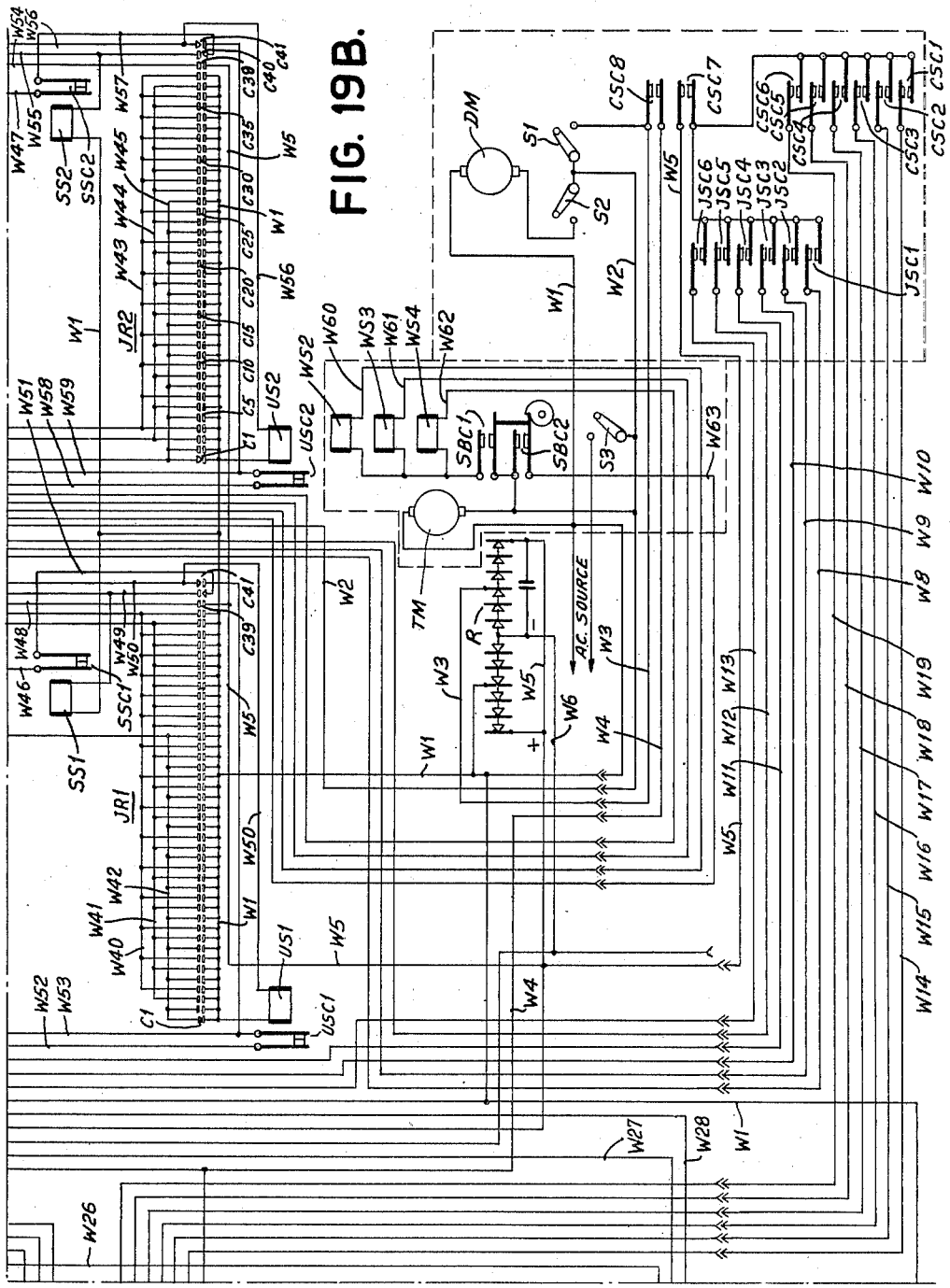

June 5, 1951   R. D. DODGE   2,555,734
AUTOMATIC JUSTIFYING TYPEWRITER
Filed Dec. 21, 1945   15 Sheets-Sheet 15
FIG. 19D.
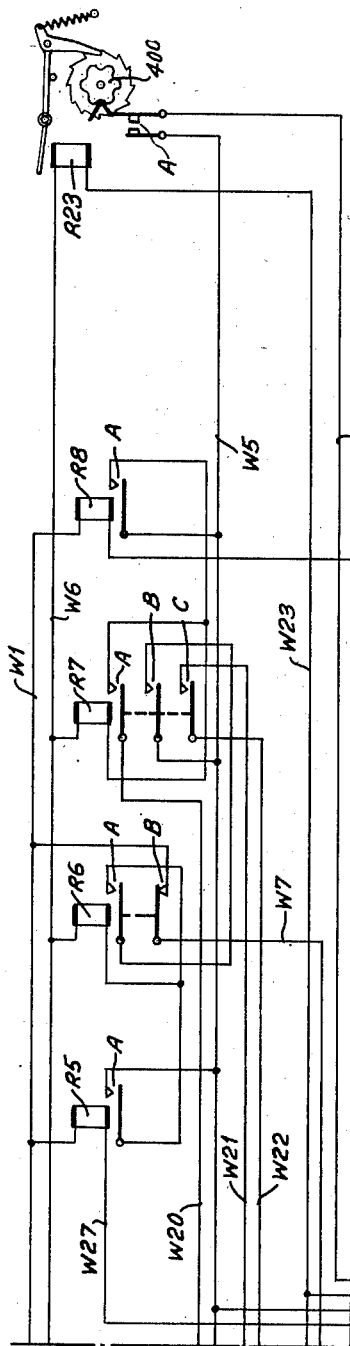
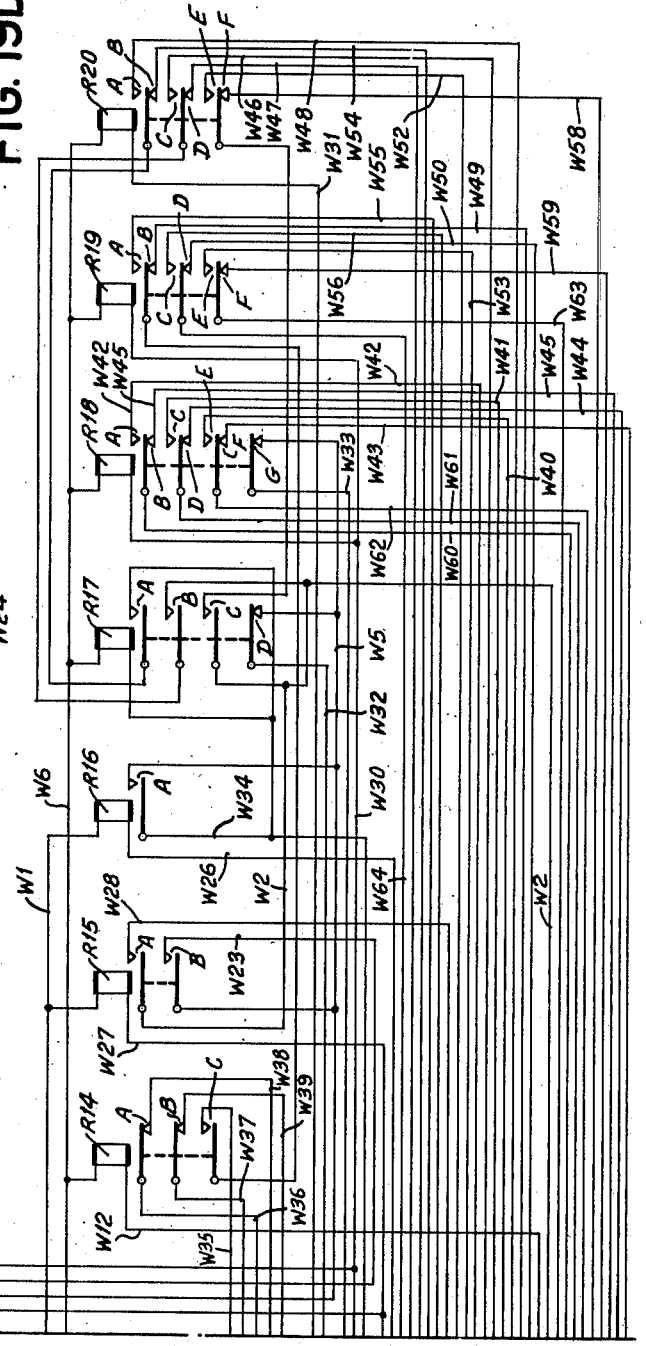
INVENTOR
R. D. Dodge
BY
ATTORNEY Patented June 5, 1951

2,555,734

UNITED STATES PATENT OFFICE 2,555,734

AUTOMATIC JUSTIFYING TYPEWRITER

Ronald D. Dodge, Poughkeepsie, N. Y., assignor to International Business Machines Corporation, New York, N. Y., a corporation of New York Application December 21, 1945, Serial No. 636,525

50 Claims. (Cl. 197—20)

This invention relates to typewriters and other typographical machines.

The primary object of the invention is to provide an improved justifying typewriter or typographical machine.

An object is to provide a justifying typewriter or typographical machine which is fully automatic in its operation.

Another object is to provide a justifying typewriter which is automatically controlled by line storage means of some kind, such as a code perforated tape.

An object is to provide automatic controlling means for a justifying typewriter.

An object is to provide automatic justification computing means for a justifying typewriter or other typographical machine.

An object is to provide justification computing means which is electrically controlled and operated.

An object is to provide an automatic justification computing means which is automatically set under control of designations in a line storage device of some kind, such as a perforated tape, in which the factors of justification, namely, line shortage and number of word spaces, are represented by suitable designating means such as code perforations.

An object is to provide error correction means.

Another object is to provide novel controlling means for causing designations erroneously registered in the storage device to be ignored in the course of automatic operation of the typewriting machine.

An object is to provide means for automatically controlling keyboard operated or controlled typographical machines such as typewriters, type setting and composing machines, and type casting machines.

An object is to provide automatic controlling means for a typographical machine, such as a justifying typewriter, which permits operation of the machine as a simple automatic letter writer without automatic justification.

An object is to provide a typographical machine capable of usefully employing the tape produced by copending application, Serial No. 636,524, filed December 21, 1945, by Ronald D. Dodge, which matured into Patent No. 2,540,027, January 30, 1951.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front view of the tape sensing mechanism.

Fig. 2 is a plan view of the sensing mechanism with cover removed.

Fig. 3 is a vertical section on the line 3—3 in Fig. 2.

Fig. 4 is a vertical section on the line 4—4 in Fig. 3.

Fig. 6 is a side elevation of one of the justification control relays.

Fig. 7 is an end view of one of the justification relays.

Fig. 8 is a vertical section on the line 8—8 in Fig. 6.

Fig. 14 is a large scale detail view showing one of the shift keys in normal position.

Figs. 15 and 16 are views similar to Fig. 14 but showing the same shift key in two different stages of operation.

Fig. 17 is a plan view showing both shift keys.

Fig. 18 is a timing chart for the cams of one of the justification control relays.

Figs. 19A to 19D together form a wiring diagram.

Figure 20:
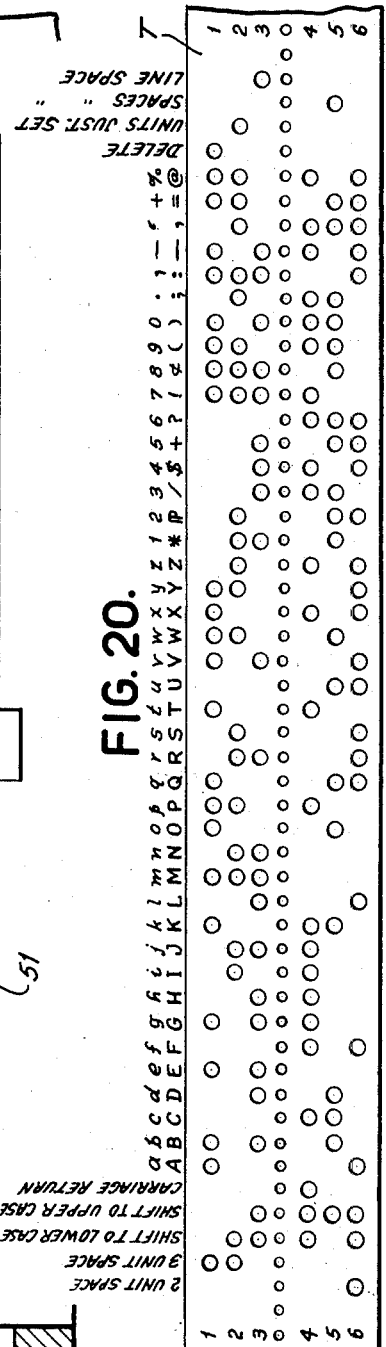

Fig. 20 is a specimen of the tape with the complete code perforated therein.

The present invention employs a control tape which may be prepared by means of the machine disclosed in copending application, Serial No. 636,524, filed December 21, 1945, by R. D. Dodge.

Figure 12:
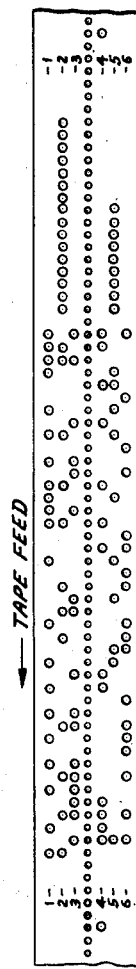
Fig. 12 is a specimen of the tape showing the code perforations of a correctly typed line.

Fig. 20 shows an enlarged specimen of the tape showing all of the code designations which may be perforated by the machine disclosed in said application. Fig. 12 shows a specimen of the tape containing all of the code designations relating to a single correctly typed line of copy.

The tape disclosed in Fig. 12 is passed through a tape sensing mechanism which is shown in Figs. 1 to 5. This mechanism is a self-contained motor driven unit including a main frame consisting of the vertical front plate 30 (Figs. 2 to 5) and a U-shaped frame 31 (Fig. 2) which are joined together by the bolts 32.

Secured to the main frame near the lower right and left hand corners (Fig. 1) of the front plate 30 are the supporting feet 33 which are secured to brackets 34. The brackets 34 are fastened to the main frame by means of the same bolts 32 as secure the members 30 and 31 together. The rear corners of the frame member 31 (Fig. 2) are also provided with similar feet 33 fixed to the brackets 35 fastened to the frame 31. Fixed to the top edge of the plate 33 (Fig. 4) is a shelf 36 which extends forwardly to provide a table over which the tape T passes. Fastened to the front edge of the plate 36 is a vertical frame plate 37 which is spaced from the plate 30 by means of the blocks 38, 39.

Rotatably mounted in suitable ball bearings 40 (Fig. 4), carried by the plates 30 and 37, is the main shaft 41 to which is fixed the large pulley 42 connected by a belt 43 to a small pulley 44 (Fig. 2) mounted on the shaft of the driving motor DM. This motor DM rotates continually while the automatic justifying system is in use.

The tape T is fed by means of two sprocket wheels 45 (Figs. 2 and 3) which are secured to the shafts 46 journaled in suitable bearings carried by the plate 36 and by bracket extensions 30a formed in the plate 30. Fixed to the shafts 46 are the ratchet wheels 47 (see Figs. 4 and 5 also) with which cooperate the feed pawls 48 pivoted on the rocking plates 49 which in turn are pivoted on the shafts 46. The pawls 48 are spring urged into engagement with the ratchets 47 at all times. Pivoted to the rocking plates 49 are the links 50 which are pivotally connected at their lower ends to a cam follower arm 51 having the roller 51a engaging a cam 52 carried by the main shaft 41. The cam follower lever 51 is urged in a counterclockwise direction (Fig. 5) to maintain the roller 51a in engagement with the cam 52 by the combined action of a spring 53 anchored to the follower 51 and springs 54 anchored to the rocking plates 49, the other ends of the springs 53, 54 being anchored to suitable pins carried by the framework.

Figure 5:
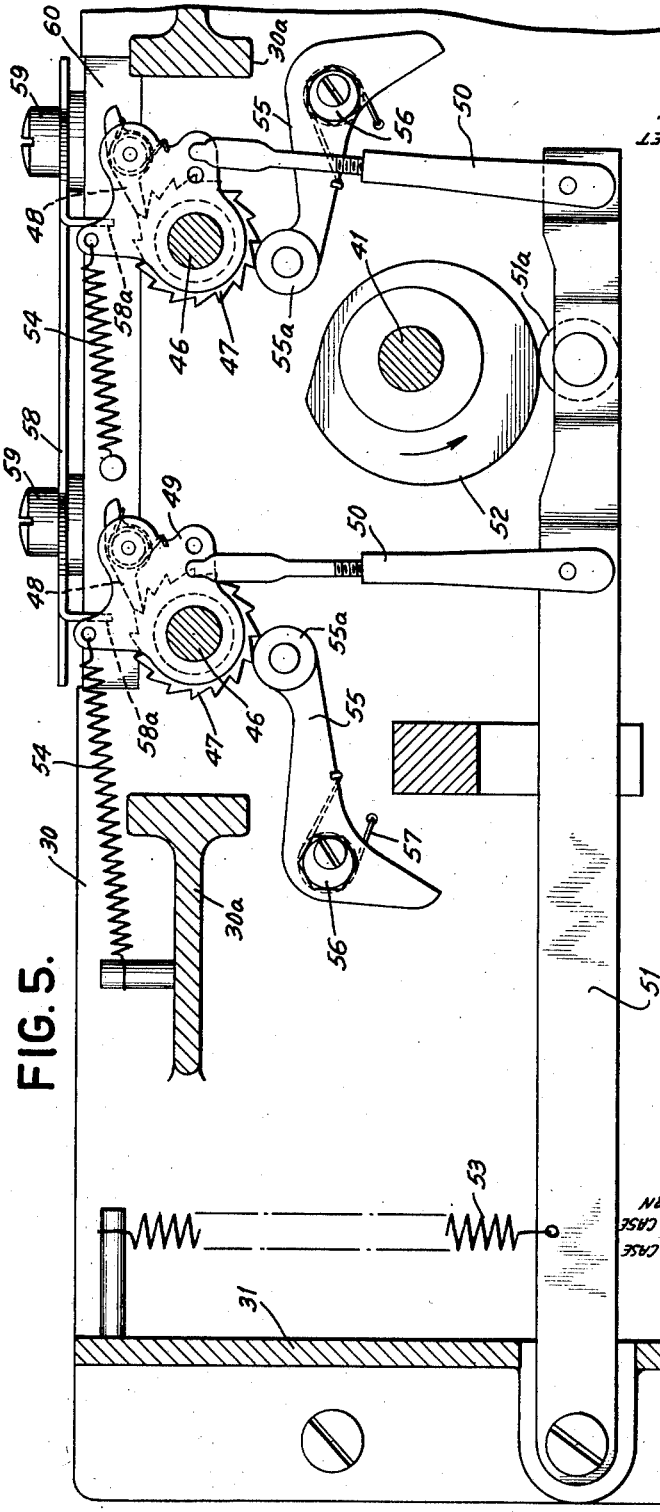
Fig. 5 is a vertical section on the line 5—5 of Fig. 2.

It is evident that, since the cam 52 rotates continually in the direction of the arrow in Fig. 5, the plates 49 will be periodically oscillated and cause the ratchet wheels 47 to be rotated intermittently in a counterclockwise direction (Fig. 5). The parts are so proportioned that the ratchet wheels 47 rotate one tooth space at a time, or the distance between two successive feed perforations on the tape T, per revolution of shaft 41.

In order to hold the tape T steady when the code perforations therein are in alignment with the sensing pins, the ratchets 47 are provided with detent arms 55 (Fig. 5) pivoted at 56 to the plate 30 and having rollers 55a engaging tooth spaces in the ratchets 47, the detents 55 being urged against the ratchets 47 by the tension spring 57. In order to prevent overthrow of the ratchets 47, there is provided a stop plate 58 (Fig. 5) which is secured to the top plate 36 and has two downwardly extending lugs 58a designed to be engaged by the pawls 48 at the end of their leftward stroke thus not only preventing further counterclockwise rotation of the plates 49, but also tending to jam the pawls 48 deeper into the tooth spaces of the ratchets 47 and prevent overthrow in a well known way.

The screws 59 which secure the plate 58 to the plate 36 also serve as a means of fastening a U-shaped plate 60 (Fig. 4) to the plate 36. The side arms 60a of the plate 60 extend forwardly a spaced distance from the top surface of the plate 36 to enable the tape T to be passed under said side arms to the sprocket wheels 45 as shown in Fig. 3. Secured to the arms 60a are the tape guides 61 which extend downwardly to the right as shown in Figs. 2 and 3 and are slotted to accommodate the teeth of sprockets 45 and prevent the tape from becoming disengaged from the sprocket teeth. For reasons which will be explained hereinafter, the tape is formed with a loop between the two sprockets 45 as best shown in Fig. 1. For the purpose of guiding the tape into alignment with the sprockets 45, the top surface of the table 36 is provided with a number of studs 62 (Figs. 2 and 4) which cooperate with the edges of the tape T.

Secured to the front face of the plate 30 by means of the bolts 32 are the brackets 63 for supporting the tape reels. The left hand bracket (Fig. 1) rotatably supports a tape reel comprising a flanged disk 64 to the top surface of which is secured an openwork reel core 65 having the inclined spoke members 65a over which is slipped the coil of tape 66 to be passed through the sensing mechanism.

The tape is led off of the coil 66 from the inside and it is for this reason that the spoked members 65a are made convergent so as to loosely hold the coil of tape. From the reel 64 the tape is led through the open guide 67 secured to the top surface of the plate 36 near its left hand end and thence the tape is led to the right between the studs 62 and underneath the left side arm 60a of the plate 60.

The right hand bracket 63 (Fig. 1) is provided with a suitable bearing carrying a shaft 68 on which is mounted the separable reel 69 keyed in a suitable fashion to the shaft 68 so as to rotate therewith. To the rear end of the shaft 68 there is fastened a suitable pulley (not shown) connected by a belt 70 (Figs. 2 and 4) to a pulley 71 on the main shaft 41. Thus the reel 69 constantly tends to turn in a clockwise direction (Fig. 1) while the motor DM is in operation. The tape passes from underneath the right hand arm 60a of plate 60 and underneath the right hand guide 61 (Fig. 2) to the reel 69. The drive of the reel 69 is the usual slipping drive which tends to overwind the reel and keep the tape T under light tension.

The holes in the tape are sensed by two substantially identical sensing mechanisms which are mounted underneath the plate 36 between the plates 30 and 37.

The main shaft 41 between the plates 30 and 37 (Fig. 4) is formed as a cam 72 with which cooperative twelve cam follower levers 73 (Fig. 3) arranged in two groups and pivoted on the bars 38, six of the cam follower levers 73 being associated with the left hand sprocket 45 while the other six are associated with the right hand sprocket, the levers 73 being staggered. Mounted on the blocks 39 are two sets of perforation sensing contacts designated JSC1 to JSC6 and CSC1 to CSC6. The levers 73 are operatively connected to the contacts by means of the links 74 which are pivoted at their upper ends to the levers 73 and their lower ends are provided with insulating buttons 74a carrying extension pins which loosely project through holes in the longer members of the sensing contacts. Also pivotally connected to the levers 73 are the first or justifier sensing pins 75 and the second or character sensing pins 76 which extend upwardly through suitable holes in the plate 36 registering with holes in the side arms 60a of the plate 60.

In the position of Fig. 3 the cam 72 is about to permit the lever 73 to rise under the stimulus of the spring tension in the longer members of the contacts JSC1 to JSC6 and CSC1 to CSC6. There are six sensing pins 75 and six pins 76 arranged in a row transversely of the tape T and spaced to correspond with the six code positions of the perforations in the tape. With the levers 73 in the position of Fig. 3, the pins 75, 76 are fully withdrawn from the holes in the tape to permit the tape to be fed by the ratchet wheels 47 as described above. After the latter have advanced the tape the distance between two feed perforations, the cam 72 permits the pins 75 to rise and, if any of the pins are blocked by the tape owing to there being no perforation present in the corresponding code position of the tape, such pins will remain in the positions shown in Fig. 3 and the corresponding contacts will remain open. If, however, there is a hole registering with a pin 75 or 76 such pin will pass through the hole in the tape and permit the contacts corresponding thereto to close. Thus, if there is a perforation in the "1" code position of the tape, the pin corresponding to the contacts JSC1 will pass through the tape and permit said contacts to close when the portion of the tape containing said perforation is over the row of pins 75. Subsequently, the same perforation will cause the pin 76 corresponding to the contacts CSC1 to rise and close said contacts. The perforations in the "2" and "5" positions, which represent the amount of justification required, are always sensed by the pins 75 and are ineffective when sensed by the pins 76. On the other hand, the code perforations designating the characters are ineffective when sensed by the pins 75 and effective when sensed by the pins 76.

Besides the perforation sensing contacts JSC1 to JSC6 and CSC1 to CSC6, the tape sensing unit is provided with two additional pairs of contacts designated CSC7, CSC8 like the others but lacking pins 75, 76. The main cam 72 operates to close contacts CSC7 once per revolution of shaft 41 slightly later than the sensing contacts, but contacts CSC8 are operated by a second cam 72a (Fig. 4) to close these contacts after the contacts CSC7 close and to open contacts CSC8 before contacts CSC7 open.

In Figs. 6 to 8 there is shown one of the two justification control relays generally designated JR1, JR2 in Fig. 19B, which determine the spacing of the typewriter carriage in writing the justified copy. Two of these relays are used in alternation, one being set up under control of perforations in one line section of the tape while the other is being used to control the spacing of the typewriter during the period in which the code representations of the characters on the next preceding line section of the tape are operative to cause the typewriter to type the line of characters represented by the code perforations. Since the relays are identical in construction only relay JR1 will be described in detail herein.

The relay JR1 comprises a frame 100 (Figs. 6 to 8) which is composed of a single strip of sheet metal bent at right angles at its ends to form a U-shaped frame as viewed in elevation (Fig. 6). The uprights 100a, 100b rotatably support two shafts designated 101, 102 each of which is provided with a means of rotating it step-by-step. Since the rotating means are identical, only the one for the shaft 102 best shown in Fig. 7, will be described in detail. Secured to the shaft 102 at its left hand or front end (Figs. 6 and 7) is a ratchet wheel 103 having 21 teeth with which cooperates a spring detent 104 preventing counterclockwise rotation of the ratchet wheel 103. Loosely mounted on the shaft 102 between the ratchet wheel 103 and the collar 105 secured to the shaft 102 is a three-armed lever 106 of which the arm 106a is connected by a link 107 to the plunger 108 of the solenoid US1 termed the units solenoid in the description of operation. The arm 106a has pivoted thereto a pawl 109 which always is spring-urged into engagement with the ratchet 103. The arm 106b has anchored to it a spring 110 which urges the three-armed lever 106 in a clockwise direction (Fig. 7).

The arm 106c of the lever 106 has a pin 106d (Fig. 7) connected by a toggle spring 111 to a pin 112a on one arm of a bell crank 112 pivoted at 113 to the upright 100b. The other arm of the bell crank 112 is provided with an insulating button 112a engaging the longer member of a pair of contact members generally designated USC1 hereinafter to be termed the units solenoid contacts, holding said contacts closed when the parts are in the position of Fig. 7. In this figure the toggle spring 111, acting on the bell crank 112, holds the arm carrying the insulating button 112a against an adjustable stop stud 114. Counterclockwise rotation of bell crank 112 to an extent sufficient to permit the contacts USC1 to open is limited by a second adjustable stop stud 115. Clockwise rotation of the lever 106 is limited by a pin 116 which engages the pawl 109 in a manner to jam it deeper into the teeth of ratchet 101 and prevents overthrow of ratchet 103 in a well known way.

When the units solenoid US1 is energized, the lever 106 is rocked counterclockwise (Fig. 7) an extent slightly less than two tooth spaces of the ratchet 103. This movement carries the arm 106c past a dead center position with respect to the pins 112a, 106d and pivot 113, thereby causing the spring 111 to rotate the lever 112 counterclockwise against the stop pin 115 thus opening contacts USC1. Upon deenergization of the solenoid US1, the spring 110 rocks the lever 106 back to the position of Fig. 7. During this movement the pawl 109 engages the next succeeding tooth of ratchet 103 and rotates said ratchet one tooth space, this movement being limited by the pin 116. When the arm 106c passes the dead center position between pins 106d, 112a, the spring 111 rocks lever 112 back to the position of Fig. 7 into engagement with the stud 114, reclosing the contacts USC.

Substantially identical mechanism is provided at the opposite end of the frame on the upright 100a to rotate the spaces shaft 101, a solenoid SS1 (Fig. 6), termed the spaces solenoid, being provided for that purpose which operates contacts (not shown) designated SSC1 in Fig. 19B.

Secured to the shafts 101, 102 are two series of 41 cams designated 120, 121 (Figs. 6 and 8), the cams being arranged in pairs with a common hub, the cams 120 being secured to the shaft 101, while the cams 121 are secured to the shaft 102. Mounted between the two rows of cams 120, 121 are two series of contact members 122, 123 which are insulatably mounted on a cross-bar 124 mounted on the uprights 100a and 100b by means of brackets 125. Each contact member 122 is associated with a cam 120 and each member 123 with a cam 121. The members 122, 123 are paired and provided with contacts generally designated C1 to C41 respectively. The cams 120, 121 are arranged to urge their respective contact members 122, 123 toward a contact closing position. Thus, in Fig. 8, rotation of the cam 120 for contacts C38 sufficiently to bring the high point 120a thereof into engagement with contact member 122 will cause the latter to move one of the contacts C38 to the left a little more than half way toward the other contact C38. Correspondingly, the rotation of the cam 121 will urge the second contact member C38 to the right an extent a little more than half way toward the mating contact C38. It is thus clear that rotation of both cams 120, 121 of a pair to a favorable position will result in closing the contact C38 but it will take both cams to effect this operation. The cams 120, 121 for contacts C2 to C37 function in the same way.

Figure 18:
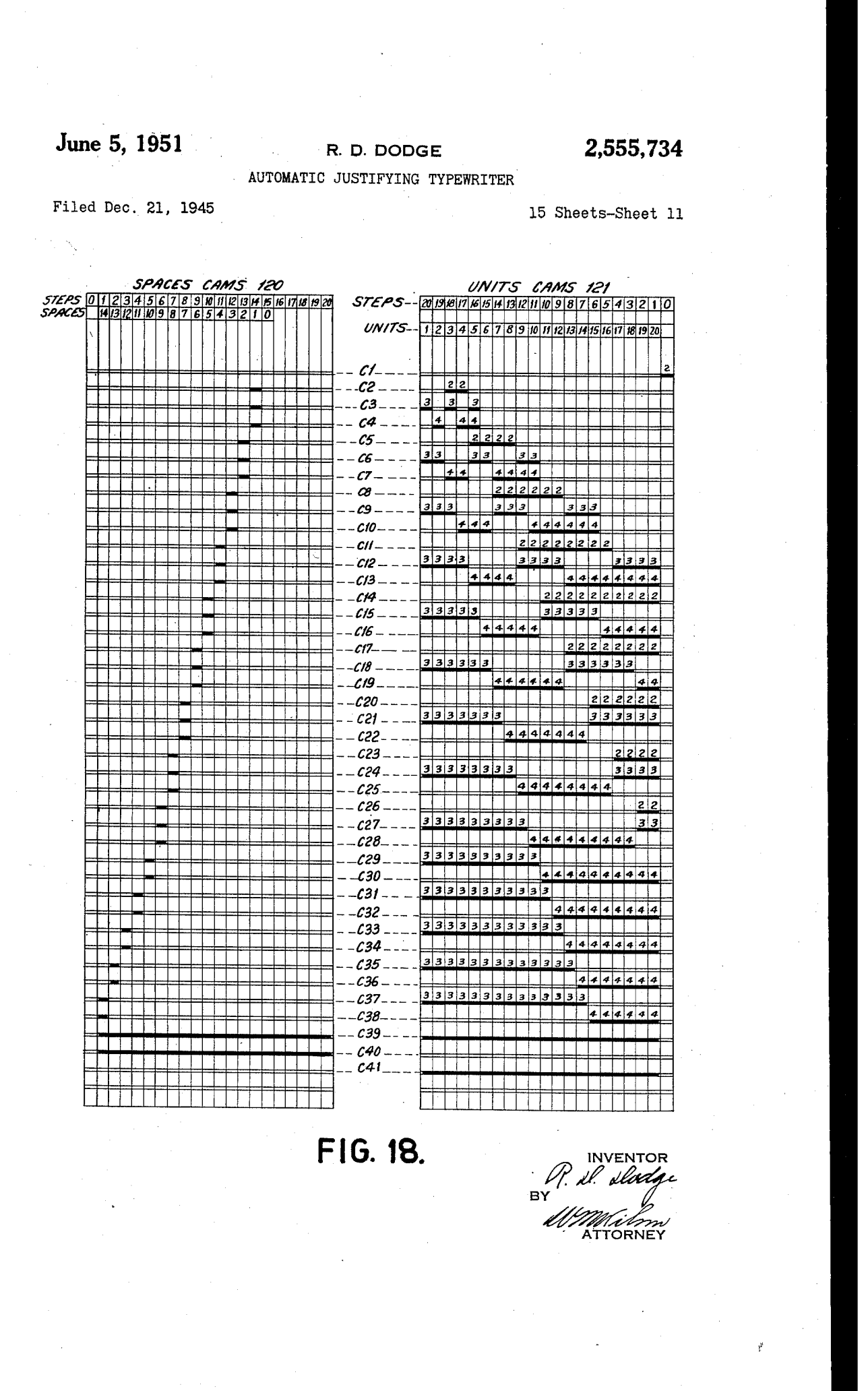

The cam 120 associated with contacts C1 does not operate the corresponding member 122 but the latter is bent to a position to enable the mating cam 121 to close the contacts C1. The same is true of the cam 120 for the contacts C41, while the arrangement is exactly the reverse for the contacts C40, cam 120 alone effecting closure of these contacts. The timing of the high points on the cams 120, 121 is shown in Fig. 18 in which the heavy black lines and rectangles indicate the lengths and relative positions of the high points. For example, the cam 120 corresponding to the contacts C2 must be rotated fourteen steps from the "0" or home position before the high point on the said cam moves the related contact member 122 of contacts C2 to the circuit closing position. On the other hand, the cam 121 operating the other contact member 123 must be rotated seventeen steps of movement to move such contact into engagement with the first contact and close the circuit therethrough. The contacts C1 are closed at the "0" position of both the cams 120, 121 but are opened when cam 121 moves one tooth space away from the "0" position. Contacts C39 are open when cams 120, 121 are in zero position but are closed when either one or both of the cams 120, 121 have moved one step from the "0" position. Contacts C40 are closed when the related cam 120 is moved one unit from the "0" position, while contacts C41 are closed when cam 121 is moved one unit from the "0" position. The remaining contacts C2 to C38 are closed and opened selectively according to the positions of their respective cams 120, 121, it requiring a pair of the cams 120, 121 in every case to close the corresponding contacts.

Relay JR2 is similarly constructed and its related parts are designated US2, SS2, USC2, and SSC2 in Fig. 19B.

Units solenoids US1, US2 are energized under control of the "2" holes in the tape as many times as such holes occur at the end of a section of tape containing the character code designations and justification code holes for one line. Similarly the spaces solenoids SS1, SS2 are energized as many times as there are "5" holes for the corresponding section of tape. It is thus apparent that, with respect to any given line section of tape, the cams 120, 121 will be rotated extents to set up the combinations of the contacts C1 to C41 which will be representative of the amount of justification for the line represented by that section of tape. The manner in which the contacts C1 to C41 control the spacing of the carriage to automatically justify each line will be described in detail hereinafter at the proper point.

It will be noted by reference to Fig. 18 that, when the cams 121 are stepped one tooth space away from the zero position, a large number of contact members 123 will be forced toward the closed contact position but, once the first step has been taken, only a few at a time of the contacts are urged toward the closed position and such movement is usually accompanied by a similar retraction of other contacts 123 to the open position. It is apparent that there is more load imposed upon the units solenoid US1 likely to make the first step of movement somewhat sluggish. For the purpose of augmenting the rotative force supplied to the cams 121 during the first step of movement, there is provided a supplemental cam 126 (Fig. 8) secured to the units shaft 102 and having a cam projection 126a. When the shaft 102 and the cams 121 are in the zero position, the projection 126a underlies a roller 127 on an arm 128 pivoted at 129 in the frame upright 100b. The arm 128 is urged in a counterclockwise direction (Fig. 8) by a fairly strong spring 130.

On the last step of restoring movement necessary to carry the cams 121 back to the zero position, the cam projection 126a strikes the roller 127 and raises the arm 128 against the tension of the spring 130 and the projection 126a travels far enough so that the roller is about to travel down the trailing side of the projection 126a which is in a counterclockwise direction in Fig. 8. The spring 130 thus tends to press the roller 127 against the trailing side of the projection 126a and thereby tends to rotate the shaft 102 and cams 121 clockwise. This is prevented, however, by reason of the fact that the pawl 109 (Fig. 7) is held in a tooth space of ratchet 103 and against the pin 116 by spring 110, thus locking the shaft 102 against rotation.

When the first impulse is imparted to solenoid US1 for the first step of rotation in setting the shaft 102, the pawl 109 will be retracted and upon the deenergization of the solenoid US1, the spring 110 will rotate the shaft 102 and cams 121 one tooth space. This movement will be assisted by the spring 130 owing to the fact that the roller 127 is pressing on the trailing side of projection 126a in a manner tending to cam the projection 126a in a clockwise direction.

The spring 130 is not powerful enough to rotate the shaft 102 of its own accord but is of just sufficient tension to prevent overloading the magnet US1 for the first step of movement. On the last step of movement in resetting the shaft 102, it will be noted in Fig. 18 that a large number of the contacts 123 will be moving into the dwells in the cams 121 and thereby will tend to urge the cams 121 clockwise (Fig. 8) and assist the spring 110 in counteracting the spring 130 thus enabling the lifting of the arm 128 to position the roller 127 in proper relation to the projection 126a in readiness for another sequence of operations. This mechanism is not required for the shaft 101 since only a few of the members 122 are moved to closed position at any one time.

The typewriter may be similar to the one disclosed in Patent No. 2,224,766 which discloses a variable spacing typewriter in which the characters are spaced according to their widths. Since the machine is substantially the same in general construction only a very brief description will be given herein. The usual character keys are designated 200 in Fig. 9 and control the cam units 201 which are operatively coupled to the power roller 202 in a well known way whenever a character key is depressed, thereby actuating one of the type bars 203 through a link 204, a sublever 205, a link 206, and a toggle link 207.

Each cam unit 201 is connected by a link 208 to a selector bar 209 (Figs. 9 and 10) pivoted on the rod 210. The selector bars 209 are provided with one or more lugs 209a by means of which the bails 211 may be selectively actuated as in Patent No. 2,224,766, according to the positions of the lugs on the levers 209. The bails 211 are individually connected to levers 212 as in Patent No. 2,224,766 which levers in turn are connected by links 213 to the members which couple the individual escapement mechanisms to the escapement operating slide 214. Thus, whenever a key 200 is depressed, the mechanism functions as in the patent to pull down one or more of the links 213 and cause the escapements to be actuated selectively and in combination according to the width of the character corresponding to the depressed key.

In the present case supplemental means are provided for pulling down the links 213 selectively and consists of the solenoids WS2, WS3, WS4 which are associated with the links 213 corresponding to the escapements which produce 2, 3, 4 units of spacing respectively. In order to enable the solenoids WS2, WS3, WS4 to pull down the links 213, the latter are provided with fixed collars 215 (Fig. 9) over which extend slotted plates 216 individually secured to the plungers of the solenoids, whereby the energization of each solenoid actuates the link 213 corresponding thereto downwardly and couples the related escapement mechanism to the slide 214. The slide 214 is operated by the usual universal bar 217 through a link 218 and lever 219 as in Patent No. 2,224,766. The numerals in the designations WS2, WS3, WS4 denote the number of units of spacing produced when the solenoids are energized.

The machine is equipped with two space bars designated SB1, SB2 which cause the carriage to be spaced two and three units of spacing, respectively. These space bars are attached to key levers designated SB1, SB2 in Figs. 9 and 11 which control cam units 230, 231 (Fig. 11) similar to the cam units 201 which actuate the type bars 203. The cam unit 230 is provided with an extension 230a cooperating with the contacts WSC1, WSC2 so as to close said contacts whenever this cam unit is rendered operative by depressing the 2-units space bar SB1. The cam units 230, 231 are connected by links 232, 233 to two similar levers 234, 235 pivoted on the rod 236 which pivots the keys 200 and sub-levers 205. The cam units 230, 231 are located at opposite ends of the power roller 202 and the levers 234, 235 corresponding thereto are connected by links 237, 238 (see Fig. 9 also) to arms 239, 240 secured to coaxial shafts 241 journaled in the framework. The shafts 241 abut near the center of the machine at which point they are separately provided with arms 242, 243 located side by side. Arm 242 enables the cam unit 230 for the 2-unit space bar SB1 to operate the slide 214 as in Patent No. 2,224,766.

Figure 9:
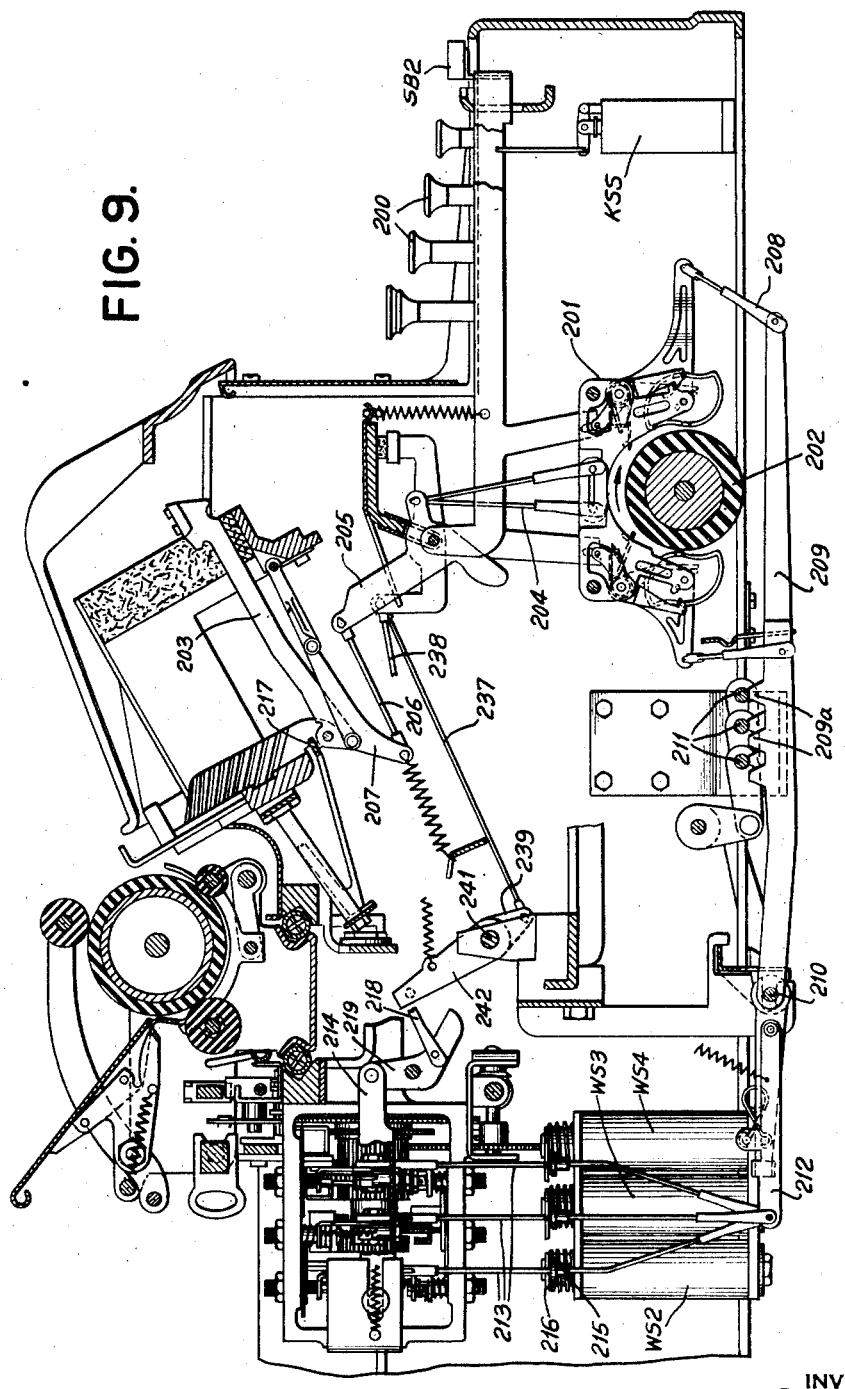
Fig. 9 is a vertical section through the typewriting machine.
Figure 10:
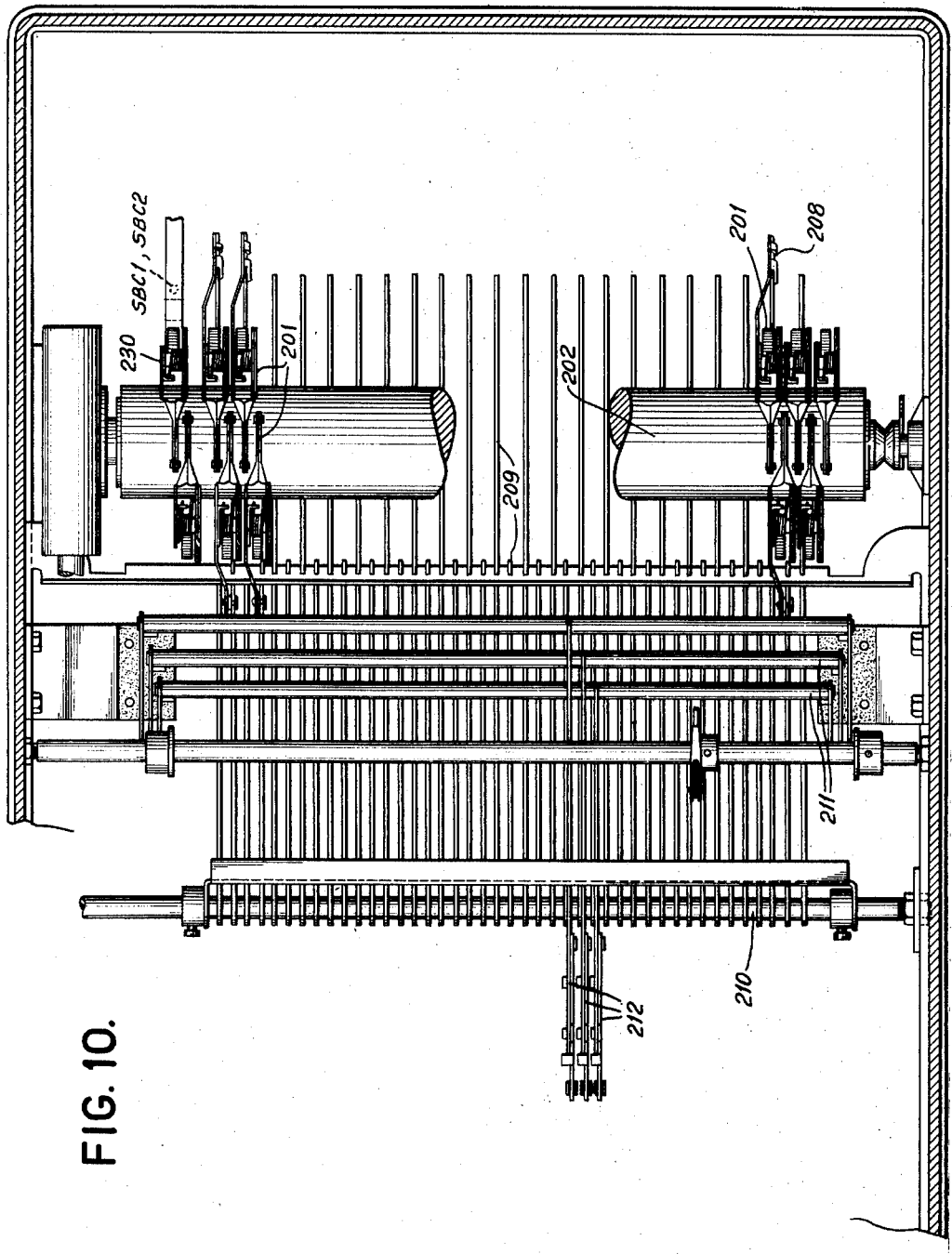
Fig. 10 is a bottom plan view of the power mechanism and escapement selecting mechanism.
Figure 11:
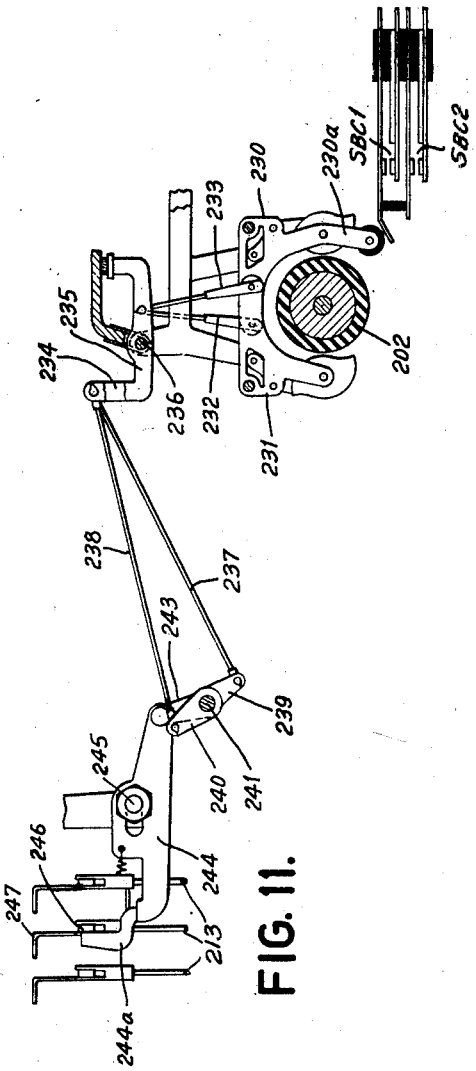
Fig. 11 is a large scale view of the two-unit space bar cam unit.

Pivoted to the arm 243 in Fig. 11 is a slide 244 which is supported and guided by a suitable slot therein through which passes a shouldered stud 245 carried by the framework of the machine. The slide 244 has an extension 244a which projects upwardly and to the rear of the dog 246 pivoted for vertical movement on the dog rocker plate 247 of the escapement which causes three units of spacing when rocked horizontally as described in Patent No. 2,244,766. The central link 213 in Fig. 9 is pivoted at its upper end to dog 246 and may be pulled down to couple dog 246 to the slide 214, as in said patent, for the purpose of operating the 3-unit escapement when characters are printed. The extension 244a is so shaped that it does not interfere with drawing of the dog 246 downwardly in selecting an escapement for operation when characters are printed.

When the 2-unit space bar SB1 is depressed by the typist, the cam unit 230 is rendered operative by power roller 202 and, besides closing the contacts WSC1, WSC2 (Fig. 11), rocks clockwise the lever 234 thereby, through link 237, rocking the arms 239, 242 (Fig. 9) and the corresponding shaft 241 in the opposite direction. This operates lever 219 and the slide 214 as in Patent No. 2,224,766.

It is apparent that, by selectively coupling the escapements to the slide 214, it is possible to obtain a variety of different spacings when the space bar SB1 is operated, ranging from a minimum of two units to a maximum of nine units. This is used to enable justification of the typed line by increasing the spacing through the medium of suitable selecting means for the solenoids WS2, WS3, and WS4. This selecting function is performed by the justification control relays and the manner in which it is effected will be made clear hereinafter.

When the 3-unit space bar SB2 is depressed, the cam unit 231 is rendered operative by the power roller 202 to draw down the link 233 and rock the lever 235 clockwise. This draws the link 238 to the right and similarly rocks the arms 240, 243 and the associated shaft 241 in the same direction thereby drawing the slide 244 to the right and operating the 3-unit escapement through the extension 244a.

The machine is provided with two shift keys designated SK1, SK2 (Figs. 14 to 17) of which the key SK1 is used to effect the shift of the type basket in the usual way whereas the key SK2 is used to release the key SK1 in the event it has been locked down by means of the shift lock key SLK. The shift lock key SLK is formed with two lugs 300a which are part of a plate 300 forming the body of the key. These lugs 300a loosely embrace the edges of the lever 301 which carries both the shift key SK1 and the shift lock key SLK. The plate 300 is formed with a vertical slot 300b through which passes a stud 301a carried by the lever 301. The plate 300 is also provided with a pin 300c which extends through the plane of the lever 301 into the plane of a latch 302 having a vertical slot embracing the stud 301a. The latch 302 has a latching shoulder 302a normally located to the left (Fig. 14) of a latch lug 303a formed in a fixed latch plate 303, the latch and key SLK being held in this position by a spring 304 anchored to the latch and to the key 301. Key lever 301 is held in the position of Fig. 14 by the usual key lever spring (not shown). The latch 302 has an extension 302b which extends upwardly to the right into engagement with a crank 305a formed in the crank shaft 305 which is suitably journalled in the framework. The key lever 301 also has a hook shaped extension 301b which underlies the crank 305a. The crank shaft 305 is provided with a similar crank 305b underneath the key SK2 with which the latter has a slotted connection whereby depression of the key SK2 causes the crank shaft 305 to rock clockwise.

When the shift key SK1 alone is operated, the lever 301 is depressed as shown in Fig. 16 without disturbing the latch 302 which remains in the position shown in Fig. 14. The pin 301a and the lugs 300a descend with lever 301 thereby allowing the shift lock key SLK to rock on the pin 300c until the shift lock key takes the position of Fig. 16. When the key SK1 is released, the usual restoring spring, not shown, restores the lever 301 to the position of Fig. 14. This movement of the shift key, of course, is accompanied by first a shift of the type basket to upper case position and then a shift back to the lower case position.

When it is desired to lock the shift key down, the shift lock key SLK is depressed instead of the key SK1. This causes the pin 300c to push lever 301 and latch 302 downwardly until the latching shoulder 302a passes below the level of the lug 303a, thereby allowing the spring 304 to snap the latch 302 to the right, or counterclockwise, to the position of Fig. 15. The lower edge of the lug 303a is slightly beveled and the shoulder 302a is slightly undercut whereby the latch 302 tends to remain in engagement with the lug 303a when the key SLK is released. Thus the parts will remain in the position of Fig. 15 as long as desired.

In order to release the key SK1, the key SK2 is depressed thereby rocking the crank shaft 305 clockwise (Fig. 15) and depressing the extension 302b. This allows the spring 304 to draw the latch 302 clockwise and upwardly to bring the latching shoulder 302a to the left of the lug 303a. This, of course, releases the lever 301 and allows its restoring spring to draw the lever back to the position of Fig. 14. It is thus apparent that at least two key actuations are required to effect a case shifting operation when the type basket is to be locked in position, as will be the situation when the machine is automatically controlled by the perforated tape.

For the purpose of operating the typewriter automaticaly under control of the tape T, the keys are provided with suitable magnets or solenoids which may be selectively energized in a manner explained more clearly hereinafter. The solenoids KSS (Fig. 9) operate the character keys; solenoid CRS operates the carriage return key; solenoid CSS operates shift lock key SLK and shift key SK1 through a link 386 (Figs. 14 to 16) attached to latch 302; solenoid SRS operates shift key SK2; while solenoids WSS2, WSS3 operate the two and three-unit space bars SB1, SB2, respectively. The foregoing solenoids all are found at the bottom of Fig. 19A.

The operation of the machine will now be described in detail. It will be assumed that a sheet of paper has been inserted around the platen of the typewriter and that the left hand marginal stop has been set at the appropriate point depending upon the width of the column which is to be typed on the work sheet on the platen.

The first step is to insert the tape with the proper loop as shown in Fig. 1, it being assumed that a foot or two of leader has been punched in the tape during its preparation in the punching machine forming the subject matter of application Serial No. 636,524, filed December 21, 1945, by R. D. Dodge, so that the tape sensing mechanism appears as shown in Fig. 1 after the tape is inserted, it being assumed that no code holes appear in the portion of the tape to the right of the sensing pins 75.

The first hole which will be detected by pins 75 will be a carriage return hole in the "4" code position at the extreme left in Fig. 12, which shows the first line section of tape.

The switches S1, S2, S3 may be closed to start the machine in operation. Closure of the switch S3 starts the typewriter motor TM by connecting the A. C. line wires W1, W2 to the A. C. source. The switch S2 connects the driving motor DM for the tape sensing unit across the line wires W1, W2. The switch S1 closes the A. C. control circuits through the tape sensing contacts JSC1 to JSC6 and CSC1 to CSC6. This starts the tape T feeding past the two analyzing stations. Eventually the first carriage return hole in the "4" position appearing at the left in Fig. 12 will be sensed by the "4" pin 75 (Fig. 3) which will cause the closure of contacts JSC4.

It will be assumed that the justification relays JR1, JR2 are both in starting position and only contacts C1 are closed. When the switch S1 (Fig. 19B) is closed the line wire W3 is connected to the line wire W2 thereby energizing the rectifier R and rendering the D. C. line wires W5 and W6 live. Since the relay R21 (Fig. 19C) is connected across the line wires W5, W6, it will be energized immediately, closing its contacts A and opening its contacts B. The closing of the contacts JSC4, arising from the sensing of the first hole in the tape, establishes a circuit from the positive D. C. line wire W5 (Fig. 19B), through the contacts CSC7 and JSC4, wire W11, and relay R11 (Fig. 19C), to D. C. line wire W6. However, the closure of contacts A of relay R11 has no effect because contacts C of relay R7 are open at this time. As a result, nothing happens for the time being and the tape continues to feed until the first code combination (Fig. 12) comprising holes in the "1" and "2" positions of the tape T is sensed by the contacts JSC1, JSC2.

While relays R12 and R13 will be energized by circuits through the contacts JSC1, JSC2, and wires W8, W9, no control circuits are established by these relays on account of the fact that their contacts are arranged to close circuits only for certain holes in a manner which will be made clear hereinafter in describing certain special functions. Hence, the tape continues to feed ignoring the code combinations which represent letters or other characters which are printed.

When the first justification holes in the "2" and "5" positions are sensed by the contacts JSC2, JSC5, the relays R13 and R14 will be energized over circuits traced as follows: the first circuit extends from the line wire W5 (Fig. 19B), through contacts CSC7, JSC2, wire W9 and relay R13, to line wire W6. The second circuit is traced through the contacts JSC5, wire W12, and relay R14, to line wire W6.

Relays R13 and R14 close their contacts C and open their contacts A and B. The closure of contacts C of these relays establishes a circuit from line wire W2 (Fig. 19B), through switch S1 and contacts CSC8, to wire W4; thence through contacts A of relays R9 and R10 (Fig. 19C); contacts B of relay R11 and contacts C of relays R12, R13; wire W64, contacts D of relay R19 (Fig. 19D), wire W50, and the units solenoid US1 (Fig. 19B) of relay JR1, to line wire W1. This causes the units shaft 192 of the left hand justification relay JR1 (Fig. 19B) to be advanced one step.

A second circuit is also established in parallel with the one just traced from contacts C of relay R12 (Fig. 19C), wire W35, contacts C of relay R14 (Fig. 19D), contacts B of relay R19, wire W49, and the spaces solenoid SS1 of the relay JR1 (Fig. 19B), to the line wire W1, with the consequence that the spaces shaft 101 of the relay JR1 also is advanced one step.

It will be noted by reference to Fig. 12 that there are nine "5" holes and sixteen "2" holes. As a result, the spaces shaft 101 in Fig. 8 will be advanced nine steps whereas the units shaft 102 will be advanced sixteen steps, the tape, of course, continuing to feed and repeatedly energize the relays R13 and R14, once for each of the respective "2" and "5" holes in the tape. All of this must occur before the first carriage return hole at the left (Fig. 12) reaches the pin 76 for the contacts CSC4. It is for this reason that the tape T is looped.

As a result of these operations, the left hand justification relay JR1 (Fig. 19B) will have been set so that the contacts C18 are closed due to the mutual cooperation of the cams 120 and 121 which operate these contacts.

The tape continues to feed until the second carriage return hole, shown at the extreme right in Fig. 12, passes the pin 75 controlling the contacts JSC4. With continued feeding of the tape, the first carriage return hole will be sensed by the contacts CSC4. The closure of the contacts CSC4 (Fig. 19B) establishes a circuit from the line wire W5 through contacts CSC7, CSC4; wire W17, and relays BR4 to BR5 (Fig. 19A) to line wire W6. Relay BR5 closes its contacts B and establishes a circuit from the wire W4 (Fig. 19A), through the contacts A of relays BR1, BR2, BR3, contacts B of relay BR5, through contacts A of relay R9, contacts A of BR17, wire W27, and relay R15 (Fig. 19D), to line wire W1. The closure of contacts B of relay R15 establishes a circuit from line wire W5, through said contacts, wire W23, and the coil of relay R23 (Fig. 19D), to line wire W6.

Relay R23 is of a type in which the coil actuates a ratchet and pawl stepping mechanism for a cam 400 (Fig. 19D) which opens and closes contacts A of this relay with successive impulses of the coil.

The energization of the coil of relay R23 causes the cam 400 to be rotated an extent to close the contacts A of this relay thereby connecting the wire W30 to the line wire W5. This energizes the relays R18 and R19 and maintains said relays in energized condition as a result of which contacts A, C, and E of both relays are closed and additionally the contacts G of relay R18 are opened. This has the effect of transferring the stepping circuits from the contacts of relays R13, R14 from the solenoids US1, SS1 for the left hand justification relay JR1 (Fig. 19B) to the same solenoids US2, SS2 of the right hand justification relay JR2 in readiness for sensing the justification holes associated with the next succeeding line section of the tape T and advancing the shafts 101, 102 of the right hand relay JR2 in a manner which will be made clear hereinafter.

At the same time the relays R18 and R19 are energized by the closure of contacts A of relay R23, the relay R20 is also energized over a circuit from wire W30 (Fig. 19C), through contacts B of relay R22, wire W31, and the coil of relay R20, to line wire W6. The relay R22 is already energized because contacts D of relay R17 are closed connecting the coil of relay R22 across the line wires W5, W6 through wire W32. The energization of the relay R15 as already described, also causes a carriage return operation of the typewriter by closing its contacts B. The circuit is traced from line wire W2, through the contacts A of relay R15 (Fig. 19D), wire W28 and the carriage return solenoid CRS (Fig. 19A) to line wire W1. The solenoid CRS depresses the carriage return key and causes the carriage to be returned by power in the usual way.

After the first carriage return hole has been sensed and the relay R23 energized as described, the first character code holes at the left in Fig. 12 reach the sensing pins 76 (Fig. 3). It will be noted that the first code representation is the combination 1—2 which, with reference to Fig. 20, corresponds to a 3-unit space indicating that the first line is to be indented.

Since the first line is to be indented, the code combination of a 1 and a 2 hole is operative to select the word space solenoid WSS3 which pulls down the 3-unit space bar. The circuits by means of which this solenoid is selected are traced as follows: line wire W5 (Fig. 19B), contacts CSC7, CSC1, wire W14, and relay BR1 (Fig. 19A) to line wire W6. A similar circuit is traced through the contacts CSC2, over wire W15, through the relay BR2. The energization of these relays closes a circuit from wire W2 (Fig. 19B), switch S1, contacts CSC8, wire W4, contacts B of relays BR1, BR2 (Fig. 19A), and the contacts A of relays BR3, BR4, BR6, and BR11 through the solenoid WSS3, wire W7, and the contacts B of relay R6 (Fig. 19D) to line wire W1. The energization of the solenoid WSS3 causes the 3-unit space bar to be depressed and the carriage spaced three units. The next character code to be sensed is the combination 3—4—5—6. The relays BR3 to BR17 (Fig. 19A) will all be energized by the closure of the contacts CSC3 to CSC6, through the wires W16 to W19, inclusive. The energization of these relays causes a circuit to be traced from the wire W4, through contacts A of relays BR1, BR2, BR3, contacts B of relays BR5, BR9, BR16; through solenoids CSS corresponding to the shift lock key SLK, wire W7, and contacts B of relay R6, to line wire W1. This causes the type basket to be shifted to the upper case position and locked in that position.

The next operation is to sense the third code combination 1—4 which corresponds to the letter T. In this case the relays BR1, BR4, and BR5 are energized and establish a circuit from line wire W4 (Fig. 19A), through contacts B of relay BR1; contacts A of relays BR2, BR3; contacts B of relay BR4; contacts A of relays BR7, BR13; solenoid KSS corresponding to the letter T, wire W7, and contacts B of relay R6, to line wire W1. As a result the typewriter prints a capital letter T.

The next code designation is the combination 2—3—4—6 which energizes all of the relays except BR1, and BR6 to BR9. A circuit is thereby established from line wire W4, through contacts A of relay BR1 (Fig. 19A), contacts B of relays BR2, BR3, BR5; contacts A of relay BR8, contacts B of relay BR14, and solenoid SRS, corresponding to the shift release key SK2 to line wire W7. This causes the return of the shift mechanism to lower case position in readiness for writing subsequent characters in lower case.

In a similar manner to that described for the letter T, the machine proceeds to type the characters of the first word and eventually a "6" hole signifying a 2-unit space will be sensed by contacts CSC6. In the present case, however, while the sensing of this designation will cause the 2-unit space bar SB1 to be selected and operated, actually three units of spacing will be selected which will be determined by the setting of the shafts 101, 102, as described above under control of the justification holes in the "2" and "5" positions of the tape. The manner in which this spacing is accomplished will now be explained.

The depression of the 2-unit space bar by the solenoid WSS2 is effected by energizing all of the relays BR10 to BR17 in consequence of the closure of contacts CSC6. The circuit for selecting the 2-unit space bar solenoid WSS2 extends from line wire W4 (Fig. 19A), through the contacts A of relays BR1, BR2, BR3, BR5, BR9, and contacts B of relay BR17, and the 2-unit space bar solenoid WSS2; to line wire W7, and contacts B of relay R6 (Fig. 19D), to line wire W1.

As a result of the depression of the 2-unit space bar, the cam unit 230 (Fig. 11) associated therewith will be operated by the power roller as described above and will initially close the contacts SBC1, and establish a circuit as follows: line wire W1, contacts C18 (Fig. 19B) which it will be remembered were closed by the setting of the shafts 101, 102 of the relay JR1 in Fig. 19B, the wire W41, contacts C of relay R18 (Fig. 19D), wire W61, the 3-unit space solenoid WS3, and contacts SBC1, to the line wire W2. Thus the carriage is spaced three units.

The contacts SBC2 also close and establish a second circuit which may be traced from line wire W2 (Fig. 19B), contacts SBC2, wire W63, contacts E of relay R19 (Fig. 19D), wire W53, contacts C41, wire W59, and the units coil US1, to line wire W1. The energization of the coil US1 causes the shaft 102 to be advanced one additional step.

The top rows of numbers in Fig. 18 on both sides represent in each case both the number of holes in the tape and the number of steps of advance of the shafts 101, 102; it being remembered of course, that not more than fourteen holes representative of word spaces may appear in the illustrative tape. The second row of numbers from the top at the left in Fig. 18 represents the actual number of word spaces in the line. It will be recalled that there will be as many "5" holes punched in the tape as the difference between the actual number of word spaces in the line and fifteen. Thus, in the illustrative example (Fig. 12), there are six words spaces in the line which are represented by nine holes in the tape and by nine steps of rotation of the cams 120.

On the other hand, the second row of numbers from the top at the right in Fig. 18 denotes the actual number of units of shortage of the line. Thus in the illustrative example the line is five units short and this is represented by sixteen holes in the tape which, in effect, measure the extent of encroachment of the typing into the justifying zone. It is thus apparent in Fig. 18 that the rotation of the cams 120 nine steps and the cams 121 sixteen steps results only in the closure of the contacts C18.

In order to determine which contacts of the relays JR1, JR2, will be effective after the cams 120, 121 of one of them have been set as described above, it is first necessary to run down the column identified at the top with the proper number of "5" holes in the tape until the first solid line denoting contact duration is encountered and then run down the column at the right corresponding to the number of "2" holes in the tape to determine which of the contacts C2 to C38 are closed by the joint effect of a particular pair of cams 120, 121. In the illustrative example, it will be observed, by tracing down the column denoting nine holes or six spaces, that the contacts C17, C18, C19 are possible.

It will be observed that there is a solid line for C18 denoting the selection of three units and extending from the fifteenth step position to the twentieth step position of advance. Thus it is evident that only the contacts C18 are affected in the illustrative case and that subsequent step-by-step rotation of cams 121 forwardly to the zero position does not change the contacts C18. Thus the contacts C18 maintain the selection of the solenoid WS3 for all except the last of the remaining steps of movement of the cams 121 during the sequence of operations involved in typing the first line. By the time the fifth word space has been effected, the cams 121 will have stepped back to the zero position causing the contacts C18 to open and C1 to reclose since the latter contacts are independent of the positions of the cams 120.

The machine now proceeds to type the next word by steps similar to the foregoing until another 2-unit space hole is sensed at which time the same circuits will be closed as before to select the 3-unit space solenoid WS3. This selecting action of the 3-unit word space solenoid WS3 continues in the case of the line on the tape in Fig. 12 and has the effect of causing the line to come out even. In this case, the line is five units of spacing short of filling the line since it will be observed in Fig. 12, that there are only sixteen holes in the "2" position. This spacing of the carriage three units instead of two units for the first five word spaces in the line causes the five units of shortage in the line to be made up.

Each time the carriage is spaced between words, the shaft 102 will be advanced one step as described above, but it will be noted in Fig. 18 that this does not change the selection, contacts C18 remaining closed until the fifth step which will not only cause the contacts C18 to break, but will also carry the shaft 102 back to the starting position. While there are six word spaces in the line, the movement of the shaft 102 back to the starting position with the fifth step causes the contacts C41 to open and prevent further advance of the shaft 102 beyond the zero position. The contacts C1 are closed when the relay JR1 is in starting position. The opening of contacts C18 disconnects the circuit through the solenoid WS3.

When the sixth word space is effected, the closing of contacts C1 enables a circuit to be closed through the solenoid WS2 as follows: line wire W1 (Fig. 19B), contacts C1, wire W42, contacts A of relay R18 (Fig. 19D), wire W60, solenoid WS2 (Fig. 19B), and contacts SBC1, to line wire W2. The contacts SBC1 are closed in the present case by reason of the fact that the last hole in the "6" position, signifying 2-unit word space, has caused the cam unit 230 to close contacts SBC1. It will be understood that these contacts are similarly rendered operative for each of the word space operations previously described in which the solenoid WS3 was selected.

The remaining character code designations in the tape corresponding to the last word in the line are now successively sensed and the character keys selected by energizing the solenoids KSS to print the last word in the same general manner described above.

After the last character in the line is typed, the justification holes in the "2" and "5" positions of the tape T are sensed by the contacts CSC2, CSC5. This causes the relays BR2 and BR6 to BR9 (Fig. 19A) to be energized and their contacts close a circuit from line wire W4 (Fig. 19A), contacts A of relay BR1, contacts B of relay BR2, contacts A of relays BR3, BR5; contacts B of relay BR8, contacts A of relay BR15; wire W26, and relay R16 (Fig. 19D), to line wire W1. Relay R17 is also energized over a parallel circuit from wire W5, through contacts A of relay R16, wire W34, and the coil of relay R17, to wire W6. The relay R17 is kept energized by a holding circuit which extends from line wire W6, through the coil of relay R17, wire W34, contacts A of said relay, contacts A of relay R20, wire W48, contacts C39 (Fig. 19B) of the left hand justification relay JR1, to line wire W5.

At this point, it should be remembered that the contacts C39 are so arranged that both cams 120, 121 on the shafts 101, 102 must be returned to the zero position before the contacts C39 can open, this effect being obtained by adjustment of the contacts so that the air gap between the contacts in open position is less than the rise of either cam. Since the spaces shaft 101 is not yet in zero position, the holding circuit for relay R17 will be maintained until shaft 101 has been advanced to the zero position. The manner in which the shaft is advanced to complete the restoration of the left hand justification relay JR1 to zero will now be made clear.

The closure of contacts B of relay R17 permits a restoring circuit to be established as follows: line wire W2 (Fig. 19D), contacts B of relay R17, contacts C of relay R20, wire W46, the contacts SSC1, wire W51, contacts C40, and spaces solenoid SS1, to line wire W1. The energization of solenoid SS1 causes the spaces shaft 101 of relay JR1 to be advanced one step and the contacts SSC1 break the circuit through the solenoid.

Since relay R17 is still energized, the reclosure of contacts SSC1 causes solenoid SS1 to be again energized with the result that the solenoid SS1 is intermittently pulsed and causes progressive rotation of the shaft 101 until ultimately it reaches zero and the contacts C39, C40 open and prevent further impulses to the solenoid SS1 by breaking the holding circuit for the relay R17.

The foregoing description has dealt solely with the manner in which the left hand justification relay JR1 has been set according to the justification holes for the first line section of the tape and the manner in which said line is typed during the course of which the relay JR1 selects one of the word spacing solenoids WS2, WS3, WS4 to expand the line to the extent necessary to compensate for the extent of shortage of this line. Before the second carriage return hole in the tape is sensed by the contacts CSC4 and immediately after the last part of the first line has been typed, it is necessary that the justification holes for the second line section of the tape be sensed by the contacts JSC2, JSC5 and be effective to set the right hand justification relay JR2.

It will be remembered that when the first carriage return hole shown at the left (Fig. 12) was sensed by the contacts CSC4, the relays R18, R19, and R20 were energized. This renders the relay JR2 capable of being set under control of the justification holes in the second line section of the tape while the first line section of the tape is being sensed by the contacts CSC1 to CSC6. The relays JR1, JR2 operate under control of alternate line sections of the tape and are automatically rendered operative to take new justification settings from the tape by the sensing of the carriage return holes by the contacts CSC4.

When the first "2" and "5" holes in the second line section of the tape effect the closure of the contacts JSC2, JSC5, the relays R13 and R14 will be energized by the same circuits as described above in dealing with the first line section of the tape. The relays R13 and R14 will close generally similar circuits to those described above through the solenoids US2, SS2 of the relay JR2. The first circuit is traced from line wire W2 (Fig. 19B), through switch S1, contacts CSC8, wire W4, contacts A of relays R9 and R10 (Fig. 19C), contacts B of relay R11; contacts C of relays R12, R13; wire 64, contact C of relay R19 (Fig. 19D), wire 56, and units solenoid US2 (Fig. 19B) of relay JR2, to line wire W1. This causes the units shaft 102 of the relay JR2 to be advanced one step. The second circuit is traced in parallel with the one just traced, from contacts C of relay R12 (Fig. 19C), wire W35, contacts C of relay R14 (Fig. 19D), contacts A of relay R19, wire W55, the spaces solenoid SS2 of the relay JR2 (Fig. 19B), to line wire W1, with the consequence that the spaces shaft 101 of the relay JR2 also advances one step.

The foregoing will take place after the last part of the first line and while the justification holes for the first line are being sensed by the contacts CSC1 to CSC6 and will be completed by the time the second carriage return hole is sensed by contacts CSC4. During this period of time, that is, after the first line has been typed, but before the second carriage return hole is sensed by contacts CSC4, the relay JR1 will be restored in the manner described above and the second carriage return hole will close a circuit to the relay R23 in the same manner as described above, causing the cam 400 to be advanced sufficiently to open the contacts A of relay R23, thereby deenergizing the relays R18, R19, and R20.

The deenergization of the relays R18, R19, R20 places the circuits in condition to render the relay JR2 effective to select the solenoids WS2, WS3, WS4, in the same manner as described above with respect to the relay JR1, while the second line section of tape is being typed under control of the contacts CSC1 to CSC6. A carriage return operation is also instituted when the second carriage return hole is sensed by the contacts CSC4 thus placing the machine in condition for typing the second line.

When the "6" hole, denoting the first word space in the second line, causes the closure of contacts CSC6 the 2-unit space bar is depressed by solenoid WSS2 as described above to select the appropriate one of the solenoids WS2, WS3, WS4 according to the positions of the cams 120, 121 of the relay JR2. This effect is produced by the closure of the contacts SBC1 and the initial circuit is traced as follows: line wire W1 (Fig. 19B); the appropriate one of the contacts C2 to C38, inclusive; one of the wires W43, W44, W45; contacts F, D, or B of relay R18 (Fig. 19D); wires W60, W61 or W62; the appropriate solenoid WS2, WS3, WS4; and contacts SBC1, to line wire W2 thus spacing the carriage the proper amount. The contacts SBC2 also close and establish a circuit from line wire W2 (Fig. 19B), the contacts SBC2, wire W63, contacts F of relay R19 (Fig.

19D), wire W59, contacts C41 of relay JR2 (Fig. 19B), wire 56, and units solenoid USC2 of relay JR2, to line wire W1, thus advancing the cams 121 of relay JR2 one step exactly as in the case of the relay JR1 described above with respect to the first line section of the tape.

When the typing of the second line under control of the second line section of tape is completed, the relay JR2 will be restored in the same general fashion as described above but the solenoid SS2 will be selected instead of the solenoid SS1 arising from the fact that contacts D of relay R20 are now closed whereby the restoring circuit will go by way of wire W47 instead of wire W46.

The justification relays in effect act as computing devices for determining how much spacing is needed and how the spacing is to be distributed among the word spaces in typing a line. The cams 120, 121 are so constructed and timed that, irrespective of the number of word spaces or extent of shortage, the shortage is distributed among the first fourteen word spaces or less involved in writing a line. For example it will be noted with reference to Fig. 18 that if a line contained only one word space and involved five units of shortage, it would be necessary to word space seven units. It will be seen that only contacts C3 and C4 would be involved in this case corresponding to stepping the space cams 120 fourteen steps and the units cams 121 sixteen steps which would be represented by fourteen "5" holes and sixteen "2" holes in the tape. If the tape had contained seventeen holes corresponding to four units of shortage, the contacts C2 and C4 would be operative to cause the simultaneous energization of the solenoids WS2, WS4 and effect six units of spacing. If the line were short only three units, then contacts C2 and C3 would be involved and the solenoids WS2, WS3 would be selected. With shortages of two units and one unit, the solenoids WS4 and WS3 will be selected by the contacts C4 and C3, respectively.

It will be recalled that each time the space bar is operating in writing a line, the cams 121 are stepped forwardly towards the zero position and in the illustrative case of the first line discussed at length above in which all the circuits were traced, it happened that at the end of writing the line the units cams 121 were fully restored to zero position reclosing contacts C1. This might not happen however and would be the case if the line were, for example, two units short and involved only one space. In this case the cam 121 would be stepped forwardly nineteen steps to close the contacts C4, cam 120 being stepped fourteen steps. Since there is only one space in the line, the contacts C3 would be closed after this spacing is effected and, before typing the next line, it will be necessary to restore the cams 121 to zero, whereas in the case fully disclosed above it was only necessary to restore the cams 120. This result is obtained by means of the contacts C41.

It will be recalled that the relays R16 and R17 are energized when the "2" and "5" holes are sensed by contacts CSC2 and CSC5 and that the closure of the contacts B of relay R17 established the circuit for energizing the spacing solenoid SS1 to restore the spaces shaft 101 and cams 120 to the zero position. Contacts C of relay R17 perform a similar function for the units shaft 102 and cams 121 by closing a circuit traced from line wire W2 (Fig. 19D), contacts C of relay R17, contacts E of relay R20, wire W52, contacts USC1 (Fig. 19B), wire W53, contacts C41 of relay JR1, and units solenoid US1, to line wire W1. This advances the units shaft 102 of relay JR1 one step and the contacts USC1 open breaking the circuit. As long as contacts C41 remain closed, the solenoid US1 will be successively impulsed until the units shaft and cams 121 have been restored to the zero position, contacts C41 opening as the shaft turns to the zero position on the last impulse. When both shafts 101, 102 and cams 120, 121 are in the zero position, contacts C39 open and deenergize relay R17 exactly as described above.

When relay JR2 is being restored, relay R29 will be deenergized and the solenoid US2 will be energized over wire W53, otherwise the circuit is traced as in the preceding paragraph.

It will be noted with reference to Fig. 12 that provision has been made in punching the tape to space the initial carriage return hole for the next succeeding line section of tape (seen at the right in Fig. 12) to allow for a maximum of 21 steps of the units shaft 102. Thus, if the relay R17 is energized immediately following the sensing of the last character code designation of a given line section of the tape, there will be ample time in the course of feeding that part of the same section of the tape corresponding to the justification zone on the typewriter carriage to restore both of the shafts 101, 102 and cams 120, 121 to zero. Thus, while one of the justification relays JR1 or JR2 is being restored to zero in readiness for a new setting the other relay, JR2 or JR1, as the case may be, may be in process of being set by the justification holes of the next succeeding line section of tape.

In a case where no justification is required and no justification holes have been punched, the cams 120, 121 will not be set but will remain in the zero position and only the contacts C1 will be closed and enable the solenoid WS2 to be selected when the contacts SPC1 are closed upon the operation of the space bar in consequence of a word space designation in the tape. Since in this case the contacts C39, C40, and C41 are all open, no impulses can be delivered to the solenoids SS1, SS2, US1, US2.

In preparing the tape on the machine disclosed in application Serial No. 636,524 it was explained that in the case of a line which required no justification, the operator had the choice of depressing the SK key, in which case only a carirage return hole is made, or of depressing the justifying key JK, in which case twenty-one "2" holes will be punched besides the carriage return hole together with any number of "5" holes up to fourteen. The first case just mentioned has already been dealt with in the preceding paragraph. In the second case, the units shaft 102 and units cams 121 of the selected justification relay JR1, JR2 will be stepped forwardly 21 steps which will have the effect of bringing the relay back to zero position with respect to the units shaft and cams. The spaces shaft 101 and cams 120 will be stepped forwardly from one to fourteen steps but it will be obvious by reference to Fig. 18 that this would have no effect since, with the exception of the contacts C1, the related cams 121 cannot by themselves close any of the associated contacts C2 to C41 irrespective of the position of the cams 120. Thus, in this case also the solenoid WS2 will be selected by contacts C1 and the spacing of the typed line will correspond to the spacing of the line on the original copy as written on the machine described in said application.

Figure 13:
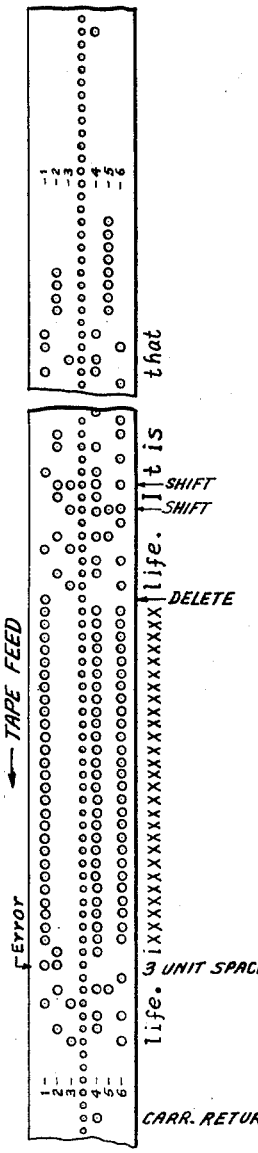
Fig. 13 is a specimen of the tape showing the code perforations for an incorrectly typed line and the corrections.

In application Serial No. 636,524 it was explained how an error may be corrected in the tape T by spacing the carriage to the end of the line and pressing the delete key to punch a delete hole in the "1" position of the tape. Fig. 13 illustrates an error in failing to shift to capitalize "I" in "It". In the present machine this delete hole is operative to cause the entire line section of the tape which contains the error to pass through the tape sensing mechanism without causing any characters to be printed. The manner in which a line section of the tape is skipped will now be explained in detail.

Figure 19A:
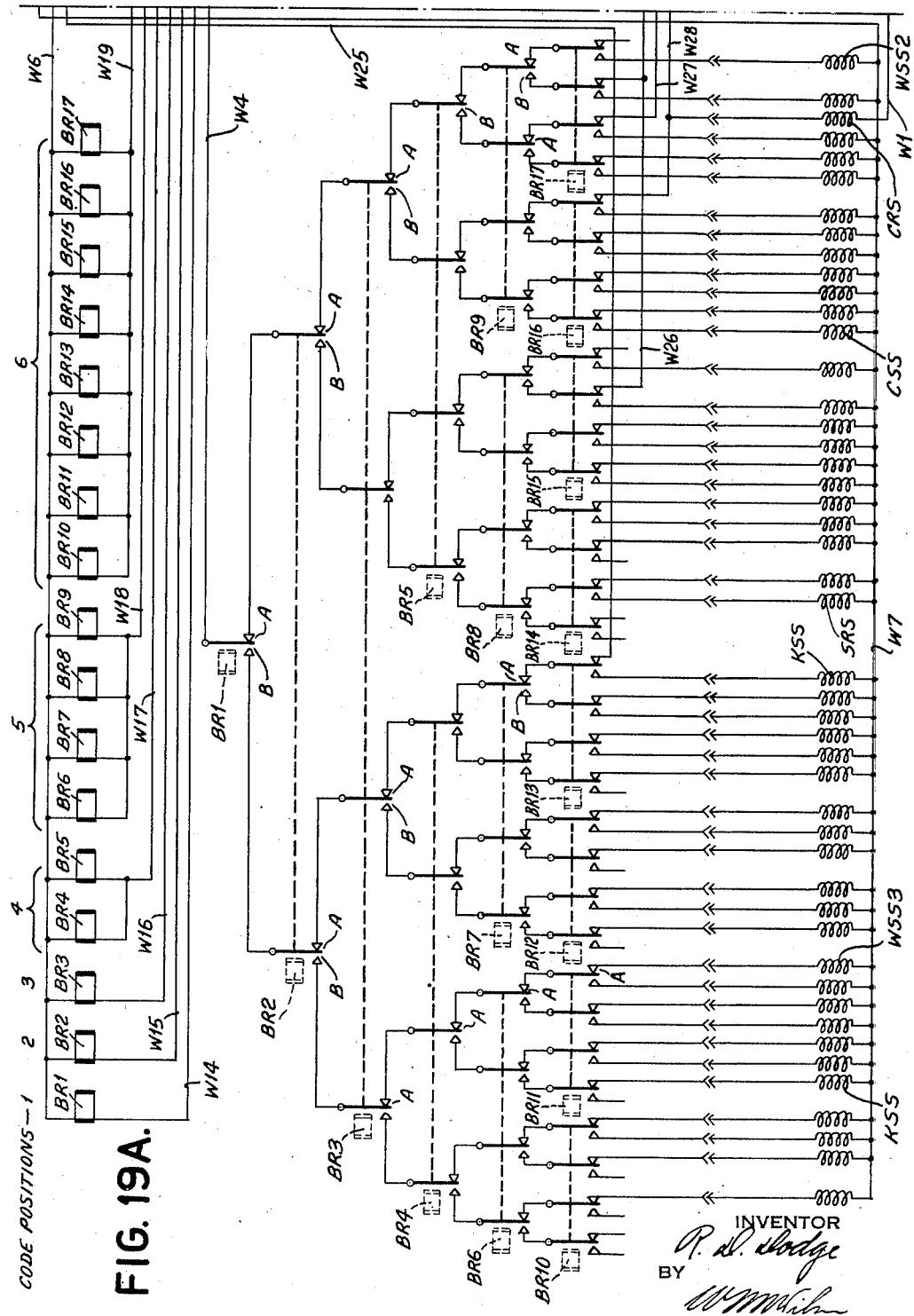
Figure 19C:
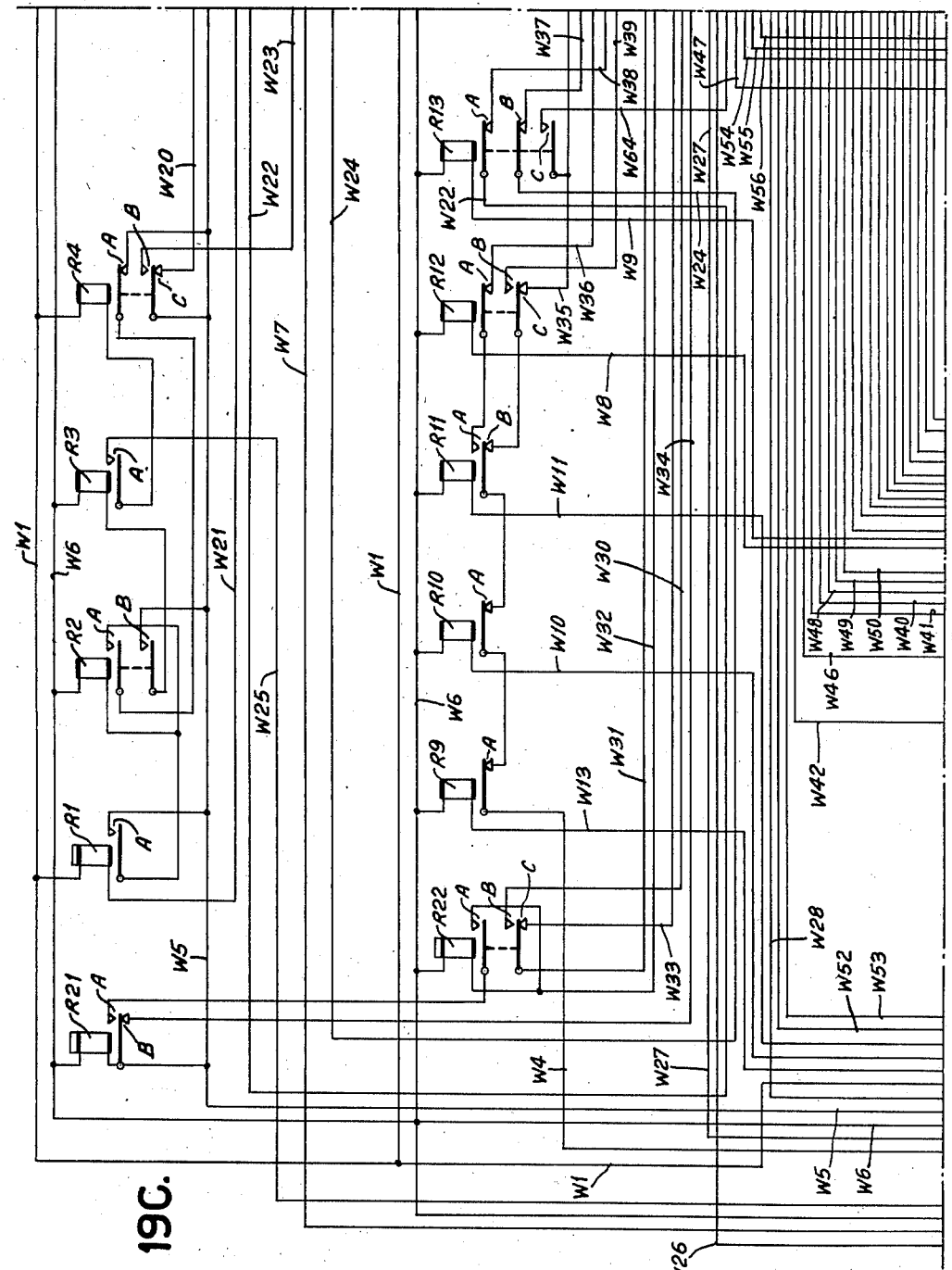

When the hole in the "1" position, signifying that a line is to be deleted, is sensed by the contacts JSC1 a circuit will be established as follows: line wire W5 (Fig. 19B); contacts CSC7, JSC1; wire W8, and relay R12 (Fig. 19C), to line wire W6. Relay R12 closes its contacts B and establishes a circuit as follows: line wire W2 (Fig. 19A), switch S1, contacts CSC8, wire W4; contacts A of relays R9, R10 (Fig. 19C); contacts B of relays R11, R12; wire W39, contacts B of relay R14 (Fig. 19D), wire W37, contacts B of relay R13 (Fig. 19C), wire W24, and relay R8 (Fig. 19D), to line wire W1. Relay R8 closes its contacts A and momentarily closes a circuit as follows: wire W5 (Fig. 19D), contacts A of relay R8, and relay R7 to line wire W6. Contacts A of relay R7 now close and establish a holding circuit for said relay across the line wires W5, W6, through the wire W20 and the contacts C of relay R4 (Fig. 19C). These operations for the time being have no effect and the sensing of the delete hole by contacts JSC1 does not interfere in any way with the typing of the characters under control of the preceding line section of the tape which at this time is being sensed by the contacts CSC1 to CSC6.

After the delete hole has been sensed by the contacts JSC1, the carriage return hole (shown at the left, Fig. 13) at the end of the preceding section of tape, that is, between the last correct section of tape and the erroneous section of tape, will be sensed by the contacts CSC4. This will cause the energization of the relays BR4, BR5 and will close a circuit as follows: line wire W4 (Fig. 19A); contacts A of relays BR1, BR2, BR3; contacts B of relay BR5; contacts A of relays BR9, BR17; wire W27, and relay R5 (Fig. 19D), to line wire W1. Relay R15 also is energized in parallel with relay R5.

Contacts A of relay R5 close a circuit from line wire W5 (Fig. 19D), through relay R6, to line wire W6. Since relay R7 is still energized at this time and its contacts B are closed, a holding circuit for relay R6 is set up across the line wires W5, W6 through contacts B of relay R7. The contacts B of relay R6 open and disconnect the common wire W7 for all of the key selecting solenoids KSS from the line wire W1, thereby suppressing further printing operations. Relay R15 closes a circuit from line wire W2 (Fig. 19D), contacts A of relay R15, wire W28, and solenoids CRS (Fig. 19A) to line wire W1 and the typewriter carriage will be returned.

The tape continues to feed without any characters being printed until the carriage return hole which follows the corrected section of tape (shown at the right, Fig. 13) is sensed by the contacts JSC4, the delete hole not yet having reached the contacts CSC1. At the time this carriage return hole is sensed the contacts CSC1 to CSC6 will still be sensing the "X" holes punched in the tape (see Fig. 13) to fill out the line length in the tape before punching the delete hole. The carriage return hole at the end of the corrected section of the tape establishes a circuit from line wire W5 (Fig. 19B), through contacts CSC7, JSC4; wire W11, and relay R11 (Fig. 19D) to wire W6. This allows contacts A of relay R11 to close and establishes a circuit as follows: line wire W2 (Fig. 19B), switch S1, contacts CSC8, wire W4; contacts A of relays R9, R10, R11, R12 (Fig. 19C); wire W36, contacts A of relay R14 (Fig. 19D), wire W38, contacts A of relay R13 (Fig. 19C), wire W22, contacts C of relay R7 (Fig. 19D), wire W21, and relay R1 (Fig. 19C) to line wire W1.

Contacts A of relay R1 (Fig. 19C) close and energize relay R2 across the line wires W5, W6. Contacts A of relay R2 close and establish a holding circuit for relay R2 which extends from line wire W5 through contacts A of relays R4 and R2, and the coil of relay R2, to line wire W6. Contacts B of relay R2 close and connect the coil of relay R3 across the line wires W5, W6. Contacts A of relay R3 close and connect relay R4 to the contacts A of relay BR17 (Fig. 19A) through the wire W25.

After the carriage return hole at the right (Fig. 13) has been sensed by the contacts JSC4, the tape continues to feed until ultimately the delete hole is sensed by contacts CSC1. This closes a circuit from line wire W5 (Fig. 19B), through contacts CSC7, CSC1; wire W14, and relay BR1 (Fig. 19A), to line wire W6. The energization of relay BR1 closes a circuit from wire W4 (Fig. 19A) through contacts B of relay BR1 and contacts A of the relays BR2, BR3, BR4, BR7, and BR13; wire W25, and contacts A of relay R3 and the coil of relay R4 (Fig. 19C), to line wire W1.

Relay R4 opens its contacts A to deenergize relays R2, R3. Relay R4 opens its contacts C to deenergize relay R7. Relay R7 opens its contacts B to deenergize relay R6. With the deenergization of relay R6 and reclosure of its contacts B, the common wire W7 for the key selecting solenoids KSS is reconnected to the line wire W1 thereby permitting the resumption of printing operations.

The closure of contacts B of relay R4 energizes relay R23 to advance this relay one tooth space and operate its contacts A to open or close said contacts and select the proper one of the justification relays JR1, JR2 which is to be used for storing the justification factors for the next line section of the tape immediately following the section for the corrected line and the one which is to be used in justifying the corrected line. Before the delete hole is sensed by contacts CSC1 and the foregoing circuits set up, one of the relays JR1, JR2 will be set under control of the justification holes at the right (Fig. 13) for the corrected line.

There is a possibility that the justification relays JR1, JR2 might not be in the zero or reset position at the commencement of operations of the machine. In order to be absolutely sure that the relay which will be pulsed first will be in a receptive condition before operations under control of the tape are commenced, means is provided to cause the automatic resetting of the selected relay as soon as the main switches S1, S3 are closed. For this purpose the relays R21 and R22 are provided and are of the slow acting type.

In order to understand the operation of automatic resetting, it will be assumed that the contacts A of relay R23 are open whereby relays R18, R19 will not be energized when the switches S1, S2 are closed and that the relay JR1 is not in zero position.

As soon as the switches S1, S3 are closed, the relay R21 is energized immediately on account of the fact that it is across the D. C. line wires W5, W6 (Fig. 19C). However, due to the fact that this relay is a slow acting relay requiring an appreciable time for its coil to build up sufficient flux to open its contacts B and close its contacts A, the relay R17 will be energized over a circuit which is traced as follows: line wire W5 (Fig. 19C), contacts B of relay R21, wire W34, and the coil of relay R17 (Fig. 19D) to line wire W6. Relay R20 is also energized by a circuit which is traced from line wire W5 (Fig. 19D), contacts G of relay R18, wire W33; contacts C of relay R22 (Fig. 19C) which, like relay R21, is slow acting and cannot immediately open its contacts C; wire W31, and the coil of relay R20 (Fig. 19D), to the line wire W6. The contacts D of relay R17 open and prevent energization of relay R22.

Relay R20 closes its contacts A and establishes a holding circuit for the relay R17 which may be traced from line wire W5 (Fig. 19B); contacts C39 of relay JR1, which, it will be recalled, remain open as long as any of the cams 120, 121 of relay JR1 are not in the zero position; wire W48, and contacts A of relays R20 and R17 (Fig. 19D), to line wire W6. This holding circuit cannot be broken until the relay JR1 is wholly in the zero position; that is, has been completely reset.

The units solenoid US1 of relay JR1 will be repeatedly energized in the same general manner described above over a circuit which is traced from line wire W2, contacts C of relay R17 (Fig. 19D), contacts E of relay R20, wire W52, contacts USC1 (Fig. 19B), contacts C41 of relay JR1, wire W50, and units solenoids US1, to line wire W1. The units shaft of relay JR1 will be stepped forwardly until the contacts C41 open at the zero position and prevent further impulses to the solenoid US1. The spaces solenoid SS1 of relay JR1 is similarly advanced by a circuit which is traced through the contacts B of relay R17, contacts C of relay R20, wire W46, contacts SSC1, wire W51, contacts C40 of relay JR1, and solenoid SS1, to line wire W1. Contacts C39 open when relay JR1 is reset and deenergize relay R17, permitting relay R22 to energize and deenergize relay R20.

In the event that the relay JR1 is in zero position when the switches S1, S3 are closed, the relay R17 will be momentarily energized but, since the holding circuit therefor cannot be established through the contacts C39 of relay JR1, the relay R17 becomes deenergized as soon as relay R21 is fully energized opening the contacts B. When this occurs, relay R22 will become fully energized and close its contacts A to establish a holding circuit for the relay R22 across the line wires W5, W6 through the contacts A of relay R21. The opening of contacts C of relay R22 prevents further energization of the relay R17 in the manner just described and the closing of the contacts B of relay R22 connects together the line wires W30, W31 to connect the relay R20 in parallel with the relays R18, R19 to condition the circuits for the transferring of the justifier relays JR1, JR2 to store and use positions, respectively, and vice versa, in accordance with the description above of the operation of the machine under tape control.

The foregoing description assumed that the contacts A of relay R23 are open when the switches S1, S3 are closed. If the contrary were the case the relays R18 and R19 will be energized but not relay R20 when relay R17 is energized. It will be remembered that the circuit for relay R20 was established by way of contacts G of relay R18. If contacts A of relay R23 are in closed condition at the time the switches S1, S3 are closed, relays R18 and R19 will be energized immediately along with relays R21 and R17. The relays R17, R18, R19 will all be energized practically simultaneously with the result that the holding circuit for the relay R17, instead of being established by way of contacts A of relay R20 and wire W48 to the contacts C39 of relay JR1, will be established by way of contacts B of relay R20 and wire W54 to the contacts C39 of relay JR2. Also the circuits established through contacts B and C of relay R17 will now extend through contacts D and F of relay R20 and the wires W47, W58 to the contacts SSC2 and USC2, and the solenoids SS2 and US2 of relay JR2 in the same general fashion as described above with reference to the solenoids SS1, US1, with the result that the relay JR2 will be reset instead of the relay JR1.

As has been apparent from the description above of the manner in which relays JR1, JR2 operate, the one which is reset in the manner described above will be the first to receive impulses under control of the justification holes in the tape. It will not be necessary to automatically reset the other relay JR1 or JR2, whichever happens to remain in set position after one of them has been automatically reset, because the remaining relay will be automatically reset in any event when the first justification holes are sensed by the contacts CSC2, CSC5 in the manner explained above. This unset relay will be potentially in "use" position but, since there will be no corresponding character and space code perforations in the section of tape preceding the first carriage return hole, the fact that the relay may remain in set position will have no effect on the operation of the machine.

The important thing to accomplish is to make sure that the first relay to receive setting impulses representing the justification holes will be reset before such impulses energize the spaces and units solenoids of the selected justification relay JR1 or JR2. The selection of the relays JR1, JR2 to receive impulses is dependent upon the condition of the contacts A of relay R23. When these contacts are open, relay JR1 must be reset since it will be the first to receive impulses representative of the factors of justification. If the contacts A of relay R23 are closed then the relay JR2 will be the first to receive the impulses and must be reset.

In order to insure proper operation of the machine under delete control, it is desirable that relay R1 be of the slow release type to give ample time for relay R2 to energize.

One of the advantages of the invention is that the machine is completely automatically operated and requires no attention by the operator other than to insert the tape and keep the machine supplied with work sheets. On account of the method of taking off the tape from the inside of the reel, it is unnecessary to rewind the tape at the end of each run of the machine but, if duplicate copies of the same matter are required, it is merely necessary to remove the coil of tape from the right hand spool in Fig. 1, place it on the left hand spool, reinsert the leading end of the tape at the tape sensing positions in the manner described above, and restart motor DM.

Another advantage of the machine is that it is always ready for operation either as an automatic justifying machine or as an automatic letter writer. This arises from the fact that, if the tape is not provided with justification holes, the justification relays will not be set and will normally cause the selection of the two unit solenoid WS2. This feature may be of importance in cases where it is not desired to justify as in the automatic printing of tables and statistical data and in the automatic writing of circular letters where it is not desired that the letters have the appearance of having been printed on a printing press, stencil duplicator, or "Multigraph." The machine may also be operated as a simple typewriter by opening the switch which controls the driving motor DM for the tape sensing mechanism. In this case, when the two unit space bar SB2 is operated manually, the solenoid WS2 will be selected in exactly the same fashion as when the solenoid WSS2 is energized.

On account of the fact that all of the functions of the typewriting machine are rendered effective by solenoids or magnets which are automatically selected, the control circuits described above may be usefully employed to control typographical machines of other types, such as line-casting and type-setting machines having keyboards which can be operated by solenoids. In such case, the solenoids WS2, WS3, WS4 will operate or control keys or other devices which select space slugs or the like of suitable widths. Thus, in a keyboard controlled type-setting machine in which the individual types are individually selected by keys, the solenoids WS2, WS3, WS4 may select type spacers of suitable widths. It will be evident that, while the machine has been disclosed as applied to a well known form of typewriter for the purposes of illustrating the principle and mode of operation of the invention, it is not limited to a typewriting machine but may be used in conjunction with other forms of typographical machines.

While there have been shown and described and pointed out the fundamental novel features of the invention, as applied to a preferred embodiment, it will be understood that various omissions and substitutions and changes in the form and details of the device illustrated and in its operations may be made by those skilled in the art without departing from the spirit of the invention. It is the intention, therefore, to be limited only as indicated by the scope of the following claims.

What is claimed is:

1. An automatic typographical machine comprising means for feeding a control tape having perforations representing the characters of a line of composition and perforations representing factors of justification; means to sense said perforations, including contacts selectively closed according to the significance of the character and justification designations; a typewriter having a series of character selecting magnets for controlling printing of a line of composition represented by said character perforations, said contacts closing circuits for selecting said magnets, said typewriter also having a series of space selecting magnets; and justification computing means, including a plurality of setting magnets each corresponding to a different factor of justification and energized by the closure of those contacts which are closed under control of the justification designations, and including contact means controlled by said setting magnets to select said space selecting magnets.

2. An automatic typographical machine comprising means to feed a record strip divided into line sections each of which contains a sequence of designations representing the characters of a single line of composition, the word spaces, the line shortage, and the number of word spaces in said line of composition, respectively; means for printing said line under control of the character and word space designations including word space selecting means for varying word spacing, means for computing justification including means for controlling the word space selecting means to select the spacing according to the justification requirements, and means for setting the justification computing means under control of the line shortage and number of word space designations respectively.

3. An automatic typographical machine comprising means to feed a record strip divided into line sections each of which contains a sequence of designations representing the characters of a single line of composition, the word spaces, the line shortage, and the number of word spaces in said line of composition, respectively; means for printing said line under control of the character and word space designations including word space selecting means for varying word spacing, means for computing justification including means for controlling the word space selecting means to select the spacing according to the justification requirements; and means for setting the justification computing means under control of the line shortage and number of word space designations respectively, including means variably selectively settable according to the number of word spaces in the line and the extent of shortage of the line.

4. An automatic typographical machine comprising means to feed a record strip having a series of line sections, each line section having a sequence of designations representing the characters and word spaces in a single line of composition to be justified and having designations representing the factors of shortage of said line and the number of word spaces in said line respectively; means controlled by the character and word space designations for printing said line of composition including means for varying the spacing of the characters; and means for computing justification, including means for entering the factors of justification in said computing means under control of said factor of justification designations, and including means for controlling the space varying means to vary the spacing sufficiently to justify said line.

5. An automatic typographical machine comprising means to feed a record strip having a series of line sections, each line section having a sequence of designations representing the characters and word spaces in a single line of composition to be justified and having designations representing the factors of shortage of said line and the number of word spaces in said line respectively; means controlled by the character and word space designations for printing said line of composition including means for varying word spacing; and means for computing justification, including means for setting said computing means in accordance with said factor of justification designations, and including means jointly set by the setting means for controlling the space varying means sufficiently to justify said line.

6. An automatic typographical machine comprising means to feed a record strip having a series of line sections, each line section having a sequence of designations representing the characters and word spaces in a single line of composition to be justified and having designations representing the factors of shortage of said line and the number of word spaces in said line respectively; means controlled by the character and word spacing designations for sequentially printing said characters and spacing the words in the order in which they occur in a line of composition to be justified, and justification computing means settable under control of the factor of justification designations and including means for controlling the printing means to space the line sufficiently to justify such line.

7. An automatic typographical machine comprising means to feed a record strip having a series of line sections, each line section having a sequence of designations representing the characters and word spaces in a single line of composition to be justified and having designations representing the factors of shortage of said line and the number of word spaces in said line respectively; a typewriter having a character and word space selecting keyboard, means to selectively operate the keyboard under control of the character and word space designations, and space selecting means; and justification computing means, including mechanism for entering the factors of justification under control of the factor of justification designations and means to control the space selecting means to the extent necessary to justify said line.

8. An automatic typographical machine comprising means to feed a record strip having a series of line sections, each line section having a sequence of designations representing the characters and word spaces in a single line of composition to be justified and having designations representing the factors of shortage of said line and the number of word spaces in said line respectively; a typographical composing machine having a character and word space selecting keyboard and means to selectively operate the keyboard under control of the character and word space designations, said machine also having variable space selecting means; and mechanism for controlling said space selecting means in accordance with the factors of justification, including justification computing means settable under control of the factor of justification designations.

9. An automatic typographical machine comprising means to feed a record strip having a series of line sections, each line section having a sequence of designations representing the characters and word spaces in a single line of composition to be justified and having designations representing the factors of shortage of said line and the number of word spaces in said line respectively; means for printing said line of composition under control of the character designations, including space selecting means; and justification computing mechanism including a plurality of members selectively variably settable under control of the factor of justification designations, each member by its position representing a factor of justification, and means actuated by said members for controlling the space selecting means to select sufficient additional spacing to expand the line to a predetermined standard of length.

10. An automatic typographical machine comprising means to feed a record strip having a series of line sections, each line section having a sequence of designations representing the characters and word spaces in a single line of composition to be justified and having designations representing the factors of shortage of said line and the number of word spaces in said line, respectively; means controlled by the character and word space designations for printing said line of composition, including means for varying the spacing of the characters; a plurality of devices for computing justification, each device including means for entering the factors of justification for a single line in said computing means under control of said factor of justification designations, each device including means for controlling the space varying means to vary the spacing sufficiently to justify said line; and means controlled by the designations in the strip for rendering the computing devices operative alternately.

11. An automatic typographical machine comprising means to feed a record tape having a series of line sections, each line section having a sequence of designations representing the characters and word spaces in a single line of composition to be justified and having designations representing the factors of shortage of said line and the number of word spaces in said line, respectively; means controlled by the character and word space designations for printing said line of composition including means for varying word spacing; a plurality of settable devices for computing justification, each device including means for setting said computing device in accordance with the factor of justification designations for a single line section and including means jointly set by the setting means for controlling the space varying means sufficiently to justify said line; and means to select the computing devices for operation in rotation, one for each line section of tape.

12. An automatic typographical machine comprising means to feed a record tape having a series of line sections, each line section having a sequence of designations representing the characters and word spaces in a single line of composition to be justified and having designations representing the factors of shortage of said line and the number of word spaces in said line, respectively; means controlled by the character and word spacing designations for sequentially printing said characters and spacing the words in the order in which they occur in a line of composition to be justified; justification computing means including a plurality of control devices, each device settable under control of the factor of justification designations and including means for controlling the printing means to space the line sufficiently to justify such line; and means for rendering said devices effective in rotation, each for a single line section of tape.

13. An automatic typographical machine comprising means to feed a record tape having a series of line sections, each line section having a sequence of designations representing the characters and word spaces in a single line of composition to be justified and having designations representing the factors of shortage of said line and the number of word spaces in said line, respectively; a typewriter having a character and word space selecting keyboard, means to selectively operate the keyboard under control of the character and word space designations, and space selecting means; justification computing means, including two sets of mechanism for entering the factors of justification under control of the factor of justification designations and means to control the space selecting means to the extent necessary to justify said line; and means to select said sets for operation in rotation, each for one line section of tape.

14. An automatic typographical machine comprising means to feed a record tape having a series of line sections, each line section having a sequence of designations representing the characters and word spaces in a single line of composition to be justified and having designations representing the factors of shortage of said line and the number of word spaces in said line, respectively; a typographical composing machine having a character and word space selecting keyboard, means to selectively operate the keyboard under control of the character and word space designations, and also having variable space selecting means; a plurality of mechanisms for controlling said space selecting means in accordance with the factors of justification, each mechanism including justification computing means settable under control of the factor of justification designations for a single line section of tape; and means to place said mechanisms successively under control of the justification designations of successive line sections of tape.

15. An automatic typographical machine comprising means to feed a record tape having a series of line sections, each line section having a sequence of designations representing the characters and word spaces in a single line of composition to be justified and having other designations representing the factors of shortage of said line and the number of word spaces in said line, respectively; means for printing said line of composition under control of the character designations including space selecting means; justification computing means consisting of a plurality of devices, each device including a plurality of members selectively variably settable under control of the factor of justification designations for a single line section, each member by its position representing a single factor of justification, each device including means actuated by said members for controlling the space selecting means to select sufficient additional spacing to expand the line to a predetermined standard of length; and means for selecting said devices one at a time for receiving settings from the line sections of tape and also effective for controlling said space selecting means in accordance with said settings.

16. In an automatic justifying typewriter system, a typewriter having variable spacing mechanism, means for sensing a control tape divided into a succession of line sections each containing both character designations and justification designations representing factors of justification, justification computing means for controlling the variable spacing mechanism in accordance with factors of justification, means controlled by the character designations in the tape for operating said typewriter to type a line; means controlled by the justification designations for setting said computing means in accordance with the factors of justification, including a plurality of sets of setting devices; and means for selecting said sets of devices for operation, one set at a time, in rotation under control of the justification designations of successive line sections.

17. An automatic typographical machine comprising means for feeding a control tape having perforations representing the characters of a line of composition and perforations representing factors of justification, means to sense said perforations, means controlled by the sensing means for printing said line of composition, justification computing means including a plurality of sets of devices controlled by the sensing means for setting the computing means in accordance with the justification perforations, means controlled by said computing means for justifying the line printed by the printing means, and means to select said sets of devices for operation one at a time in rotation.

18. An automatic typographical machine comprising means for feeding a control tape having perforations representing the characters of a line of composition and perforations representing factors of justification, means to sense said perforations, a typewriter having variable spacing mechanism selectively controllable to vary spacing and means selectable by the sensing means for automatically printing a line of composition represented by the character perforations, justification computing means including a plurality of means controlled by the sensing means for setting said computing means in accordance with the justification perforations, means controlled by said computing means for selectively controlling the spacing mechanism to justify the printed line, and means for placing the setting means under control of the justification perforations in rotation.

19. An automatic typographical machine comprising means for feeding a control tape having perforations representing the characters of a line of composition and perforations representing factors of justification; means to sense said perforations, including contacts selectively closed according to the significance of the character and justification designations; a typewriter having a series of character selecting magnets for controlling printing of a line of composition represented by said character perforations, said contacts closing circuits for selecting said magnets, said typewriter also having a series of space selecting magnets; justification computing means, including a plurality of sets of setting magnets, each magnet in a set corresponding to a different factor of justification and capable of being energized by the closure of those contacts which are closed under control of the justification designations, and including contact means controlled by said setting magnets to select said space selected magnets; and means for selecting said sets of magnets one set at a time in rotation.

20. An automatic typographical machine comprising means for feeding a record tape containing a sequence of designations representing a line of composition including characters, word spaces, and a plurality of justification factors, a selectively controllable variable spacing mechanism, justification computing mechanism including a plurality of devices for receiving the factors of justification and including means for selectively controlling the variable spacing mechanism, means for entering said factors of justification in said devices under control of said designations, and means for selecting said devices for operation in rotation.

21. An automatic typographical machine comprising means to feed a record tape divided into line sections each of which contains a sequence of designations representing the characters of a single line of composition, the word spaces, the line shortage, and the number of words in said line of composition, respectively; means for printing said line under control of the character and word space designations, including word space selecting means for varying word spacing; means for computing justification including a plurality of computing devices for controlling the word space selecting means to select the spacing according to the justification requirements, each device having means for setting the justification computing means under control of the line shortage and number of word space designations, respectively, for a single line section of tape; and means for rendering said devices effective successively each for a single line section of tape.

22. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; means controlled by the first sensing station for printing said line of composition including means for varying the spacing of the characters; and means for computing justification, including means controlled by the second sensing station for entering the factors of justification in said computing means under control of said factor of justification designations; and including means for controlling the space varying means to vary the spacing sufficiently to justify said line.

23. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; means controlled by the first sensing station for printing said line of composition including means for varying word spacing; and means for computing justification, including means controlled by the second sensing station for setting said computing means in accordance with said factor of justification designations and including means jointly set by the setting means for controlling the space varying means sufficiently to justify said line.

24. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; means controlled by the first sensing station for sequentially printing said characters and spacing the words in the order in which they occur in a line of composition to be justified; and justification computing means settable under control of the second sensing station and including means for controlling the printing means to space the line sufficiently to justify such line.

25. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; a typewriter having a character and word space selecting keyboard, means to selectively operate the keyboard under control of the first sensing station, and space selecting means; and justification computing means, including mechanism controlled by the second sensing station for entering the factors of justification under control of the factor of justification designations, and means to control the space selecting means to the extent necessary to justify said line.

26. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; a typographical composing machine having a character and word space selecting keyboard, means to selectively operate the keyboard under control of the first sensing station, and also having variable space selecting means; and mechanism for controlling said space selecting means in accordance with the factors of justification including justification computing means settable under control of the second sensing station.

27. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; means for printing said line of composition under control of the first sensing station, including space selecting means; and justification computing mechanism, including a plurality of members selectively variably settable under control of the second sensing station, each member by its position representing a factor of justification, and means actuated by said members for controlling the space selecting means to select sufficient additional spacing to expand the line to a predetermined standard of length.

28. An automatic typographical machine comprising means to feed a control tape which is divided into line sections, each section including a sequence of character designations representing a line of composition and justification designations representing factors of justifications; two record sensing stations, one for sensing said character designations and the other for sensing the justification designations of a given line section before the character designations of the given line section are sensed by the character sensing station; means controlled by the first sensing station for printing said line of composition including means for varying the spacing of the characters; and a plurality of devices for computing justification, each device including means controlled by the second sensing station for entering the factors of justification for a single line in said computing means under control of said factor of justification designations, each device including means for controlling the space varying means to vary the spacing sufficiently to justify said line; and means controlled by the designations in the tape for rendering the computing devices operative alternately.

29. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; means controlled by the first sensing station for printing said line of composition including means for varying word spacing; a plurality of settable devices for computing justification, each device including means controlled by the second station for setting said computing device in accordance with the factor of justification designations for a single line section and including means jointly set by the setting means for controlling the space varying means sufficiently to justify said line; and means to select the computing devices for operation in rotation, one for each line section of tape.

30. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; means controlled by the first sensing station for sequentially printing said characters and spacing the words in the order in which they occur in a line of composition to be justified; justification computing means including a plurality of control devices, each settable under control of the second sensing station and including means for controlling the printing means to space the line sufficiently to justify such line; and means for rendering said devices effective in rotation, each for a single line section of tape.

31. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; a typewriter having a character and word space selecting keyboard, means to selectively operate the keyboard under control of the first sensing station, and space selecting means; justification computing means, including two sets of mechanism for entering the factors of justification under control of the second sensing station and means to control the space selecting means to the extent necessary to justify said line; and means to select said sets for operation in rotation, each set for one line section of tape.

32. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; a typographical composing machine having a character and word space selecting keyboard, means to selectively operate the keyboard under control of the first sensing station, and also having variable space selecting means; a purality of mechanisms for controlling said space selecting means in accordance with the factors of justification, each mechanism including justification computing means settable under control of the second sensing station for a single line section of tape; and means to place said mechanisms successively under control of the justification designations of successive line sections of tape.

33. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; a typewriter having variable spacing mechanism selectively controllable to vary spacing and means selectable by the character sensing station for automatically printing a line of composition represented by the character designations, justification computing means including a plurality of means controlled by the justification sensing station for setting said computing means in accordance with the justification designations, means controlled by said computing means for selectively controlling the spacing mechanism to justify the printed line, and means for placing the setting means under control of the justification designations in alternation.

34. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station; means controlled by the character sensing station for printing said line of composition, justification computing means including a plurality of sets of devices controlled by the justification sensing station for setting the computing means in accordance with the justification designations, means controlled by said computing means for justifying the line printed by the printing means, and means to select said sets of devices for operation in alternation.

35. An automatic typographical machine comprising means to feed a control tape which is divided into line sections, each section including a sequence of character designations representing a line of composition and justification designations representing factors of justification; two record sensing stations, one for sensing said character designations and the other for sensing the justification designations of a given line section before the character designations of the given line section are sensed by the character sensing station, each of said sensing stations including contacts selectively closed according to the significance of the character and the justification designations, respectively; a typewriter having a series of character selecting magnets for controlling printing of a line of composition represented by said character designations, said contacts closing circuits for selecting said magnets, said typewriter also having a series of space selecting magnets; justification computing means, including a plurality of sets of setting magnets, each magnet in a set corresponding to a different factor of justification and capable of being energized by the closure of those contacts which are closed under control of the justification designations, and including contact means controlled by said setting magnets to select said space selecting magnets; and means for selecting said sets of magnets one set at a time in rotation.

36. An automatic typographical machine comprising means to feed a record tape divided into line sections each of which contains a sequence of designations representing the characters of a single line of composition, the word spaces, the line shortage, and the number of words in said line of composition, respectively; means for printing said line under control of the character and word space designations including word space selecting means for varying word spacing; means for computing justification including a plurality of computing devices for controlling the word space selecting means to select the spacing according to the justification requirements, each device having means for setting the justification computing means under control of the line shortage and number of word space designations, respectively, for a single line section of tape; and means for selecting the setting means successively, one at a time, for operation in alternation on successive line sections of tape.

37. A justification computing device for electrically controlled variable spacing mechanisms which have a plurality of magnets selectable to vary spacing, comprising a series of contacts which, when closed, select said magnets; a plurality of sets of cams to which said contacts are common for operating said contacts selectively, and means for individually rotating said sets of cams to represent factors of justification, said means including a stepping magnet for each set of cams.

38. A justification computing device for automatic typographical machines having a series of magnets representing different spacings, comprising a series of contact elements arranged in pairs for selecting said magnets; two series of differently timed cams arranged in pairs, each pair of cams operating a pair of said contact elements; and means to rotate said series of cams variable extents to represent two different factors of justification.

39. A justification computing device for automatic typographical machines having a series of magnets representing different spacings, comprising a series of contact elements arranged in pairs for selecting said magnets; two series of differently timed cams arranged in pairs, each pair of cams operating a pair of said contact elements; and means to rotate said series of cams variable extents to represent two different factors of justification, including a ratchet-and-pawl stepping mechanism for each series of cams and a stepping magnet for operating each stepping mechanism.

40. A justification computing device for automatic typographical machines having a series of magnets representing different spacings, comprising a series of contact elements arranged in pairs for selecting said magnets; two series of differently timed cams arranged in pairs, each pair of cams operating a pair of said contact elements; and means to rotate said series of cams variable extents to represent two different factors of justification, including a pair of shafts, each for one set of cams, and means to variably rotate said shafts, each an extent to represent a single factor of justification.

41. In an automatic typographical machine having a series of space selecting magnets; a series of contacts connected in groups to said magnets, there being as many groups of contacts as there are magnets; two shafts each common to all of said contacts; differently timed cams on said shafts, a cam on one shaft being paired with a cam on the other shaft to actuate one of said contacts, each pair of cams, when the respective shafts are rotated predetermined extents representative of a pair of factors of justification, closing the related contact to select one of said magnets; and means for rotating said shafts individually different extents to represent different factors of justification.

42. In an automatic typographical machine having a series of space selecting magnets, a series of contacts connected in groups to said magnets, there being as many groups of contacts as there are magnets; two shafts each common to all of said contacts; differently timed cams on said shafts, a cam on one shaft being paired with a cam on the other shaft to actuate one of said contacts, each pair of cams, when the respective shafts are rotated predetermined extents representative of a pair of factors of justification, closing the related contact to select one of said magnets; and means for rotating said shafts individually different extents to represent different factors of justification, said rotating means including a ratchet-and-pawl mechanism for each shaft and a magnet for each shaft for controlling the associated ratchet-and-pawl mechanism.

43. In an automatic typographical machine having space varying means for effecting justification of a line of composition; automatic justification computing means for controlling the space varying means in accordance with several factors of justification, including a plurality of setting magnets, one for each factor of justification and means controlled by said magnets for setting said computing means; a main power switch, and means rendered effective, by operation of the main power switch to start the machine, for impulsing said magnets to restore the setting means to starting position.

44. An automatic typographical machine comprising means to feed a record tape having a series of line sections, each for a single line of composition to be justified, each line section having a sequence of designations representing the characters of a single line and a plurality of sequences of designations representing different factors of justification, the justification sequences having numbers of designations related to the value of the factors represented thereby; means controlled by the character designations for printing said line of composition, said printing means including means for varying spacing; and a plurality of settable devices for computing justification including a plurality of members, each member settable in steps under control of one of the justification sequences extents representing one of the factors of justification whereby each device may be set to represent one of the factor of justification sequences for a single line section, each device including means controlled by the settable members for controlling the space varying means sufficiently to justify said line.

45. An automatic typographical machine comprising means to feed a record tape having a series of line sections, each for a single line of composition to be justified, each line section having a sequence of designations representing the characters and word spaces of a single line and a plurality of sequences of designations representing different factors of justification, the justification sequences having numbers of designations related to the value of the factors represented thereby; means controlled by the character and word space designations for printing said line of composition including means for varying the spacing of the characters; and means for computing justification, including means variably set according to the numbers of designations in the justification sequences for entering the factors of justification in said computing means under control of said factors of justification designations, and including means set by the variably set means for controlling the space varying means to vary the spacing sufficiently to justify said line.

46. An automatic typographical machine comprising means to feed a record tape having a series of line sections, each for a single line of composition to be justified, each line section having a sequence of designations representing the characters and word spaces of a single line and a plurality of sequences of designations representing different factors of justification, the justification sequences having numbers of designations related to the value of the factors represented thereby; means controlled by the character and word space designations for printing said line of composition including means for varying word spacing; and means for computing justification, including means for setting said computing means variable extents in accordance with the number of factor of justification designations in each sequence, and including means jointly set by the setting means for controlling the space varying means sufficiently to justify said line.

47. An automatic typographical machine comprising means to feed a record tape having a series of line sections, each for a single line of composition to be justified, each line section having a sequence of designations representing the characters and word spaces of a single line and a plurality of sequences of designations representing different factors of justification, the justification sequences having numbers of designations related to the value of the factors represented thereby; means controlled by the character and word spacing designations for sequentially printing said characters and spacing the words in the order in which they occur in a line of composition to be justified, and justification computing means including members variably settable according to the numbers of justification designations in said sequences, and including means set by said members for controlling the printing means to space the line sufficiently to justify such line.

48. An automatic typographical machine comprising means to feed a record tape having a series of line sections, each for a single line of composition to be justified, each line section having a sequence of designations representing the characters and word spaces of a single line and a plurality of sequences of designations representing different factors of justification, the justification sequences having numbers of designations related to the value of the factors represented thereby; a typewriter having a character and word space selecting keyboard, means to selectively operate the keyboard under control of the character and word space designations, and space selecting means; and justification computing means, including mechanism for entering the numbers of justification designations in said sequences, and means controlled by said mechanism for controlling the space selecting means to the extent necessary to justify said line.

49. An automatic typographical machine comprising means to feed a record tape having a series of line sections, each for a single line of composition to be justified, each line section having a sequence of designations representing the characters and word spaces of a single line and a plurality of sequences of designations representing different factors of justification, the justification sequences having numbers of designations related to the value of the factors represented thereby; a typographical composing machine having a character and word space selecting keyboard, means to selectively operate the keyboard under control of the character and word space designations, and also having variable space selecting means; and mechanism for controlling said space selecting means in accordance with the factors of justification including a plurality of members each settable variable extents according to the number of justification designations in said sequences.

50. An automatic typographical machine comprising means to feed a record tape having a series of line sections, each for a single line of composition to be justified, each line section having a sequence of designations representing the characters of a single line and a plurality of sequences of designations representing different factors of justification, the justification sequences having numbers of designations related to the value of the factors represented thereby; means for printing said line of composition under control of the character designations, including space selecting means; and justification computing mechanism including a plurality of members, each selectively variably settable under control of one of the justification designation sequences, each member by its position representing the number of designations in a factor of justification sequence, and means actuated by said members for controlling the space selecting means to select sufficient additional spacing to expand the line to a predetermined standard of length.

RONALD D. DODGE.

REFERENCES CITED

The following references are of record in the file of this patent:

UNITED STATES PATENTS

| Number | Name | Date |
|---|---|---|
| 996,300 | Timmis | June 27, 1911 |
| 1,115,473 | Cornwall | Oct. 27, 1914 |
| 1,606,126 | Houston | Nov. 9, 1926 |
| 2,067,821 | Bell | Jan. 12, 1937 |
| 2,099,762 | Thompson | Nov. 23, 1937 |
| 2,294,722 | Dodge | Sept. 1, 1942 |
| 2,375,271 | Ayres | May 8, 1945 |
| 2,379,862 | Bush | July 10, 1945 |
| 2,390,413 | Ayres | Dec. 4, 1945 |